(12) United States Patent
Ganesan et al.

(10) Patent No.: US 7,778,901 B2
(45) Date of Patent: Aug. 17, 2010

(54) INTEGRATED ELECTRONIC PRESENTMENT AND PAYMENT OF BILLS BY DIFFERENT ENTITIES

(75) Inventors: Ravi Ganesan, Roswell, GA (US); Mark Todd Harris, Alpharetta, GA (US); Hans Daniel Dreyer, Gahanna, OH (US); Kathryn Randall Wolfe, Westerville, OH (US)

(73) Assignee: CheckFree Corporation, Norcross, GA (US)

( * ) Notice: Subject to any disclaimer, the term of this patent is extended or adjusted under 35 U.S.C. 154(b) by 963 days.

(21) Appl. No.: 11/059,370

(22) Filed: Feb. 17, 2005

(65) Prior Publication Data
US 2006/0184451 A1      Aug. 17, 2006

Related U.S. Application Data

(63) Continuation of application No. 11/057,233, filed on Feb. 15, 2005, now abandoned, which is a continuation of application No. 09/301,068, filed on Apr. 28, 1999, now Pat. No. 6,856,974, which is a continuation of application No. 09/017,169, filed on Feb. 2, 1998, now Pat. No. 6,055,567.

(51) Int. Cl.
*G06Q 40/10* (2006.01)
(52) U.S. Cl. .......................................... 705/35
(58) Field of Classification Search ................... 705/40, 705/34, 39, 42, 35
See application file for complete search history.

(56) References Cited

U.S. PATENT DOCUMENTS 3,852,571 A  12/1974 Hall et al.
4,277,837 A  7/1981 Stuckert
4,319,336 A  3/1982 Anderson et al.

(Continued)

FOREIGN PATENT DOCUMENTS

EP      0542298      5/1993

(Continued)

OTHER PUBLICATIONS

Mark Langer, How to make a Billing, Communications international, Mar. 1995, 22:3 pp. 12-15.*

(Continued)

*Primary Examiner*—James P Trammell
*Assistant Examiner*—Abdul Basit
(74) *Attorney, Agent, or Firm*—Sutherland Asbill & Brennan LLP

(57) ABSTRACT

To electronically present bills and request payment of presented bills, billing information representing a bill of a biller for a payee, and an associated selectable payment indicator having a first linking function, are received from a first network site associated with a bill presentment entity via a first communications link over a communications network. The received billing information and payment indicator are displayed. An input representing a selection of the displayed payment indicator is received. Based on the receipt of this input, the first linking function is activated to establish a second communications link over the communications network to a second network site, different that the first network site, associated with a bill payment entity, and to transmit a request to pay the represented bill on behalf of the payee to the second network site via the second communications link.

29 Claims, 22 Drawing Sheets

U.S. PATENT DOCUMENTS

| | | | |
|---|---|---|---|
| 4,460,960 A | 7/1984 | Anderson et al. | |
| 4,701,601 A | 10/1987 | Francini et al. | |
| 4,713,837 A | 12/1987 | Gordon | |
| 4,734,564 A | 3/1988 | Boston et al. | |
| 4,734,858 A | 3/1988 | Schlafly | |
| 4,747,050 A | 5/1988 | Brachtl et al. | |
| 4,775,935 A | 10/1988 | Yourick | |
| 4,799,156 A | 1/1989 | Shavit et al. | |
| 4,812,628 A | 3/1989 | Boston et al. | |
| 4,822,985 A | 4/1989 | Boggan et al. | |
| 4,922,940 A | 5/1990 | Lewy | |
| 4,947,028 A * | 8/1990 | Gorog | 235/380 |
| 4,961,142 A | 10/1990 | Elliott et al. | |
| 4,977,595 A | 12/1990 | Ohta et al. | |
| 5,025,373 A | 6/1991 | Keyser, Jr. et al. | |
| 5,206,488 A | 4/1993 | Teicher | |
| 5,220,501 A | 6/1993 | Lawlor et al. | |
| 5,231,571 A | 7/1993 | D'Agostino | |
| 5,255,182 A | 10/1993 | Adams | |
| 5,283,829 A | 2/1994 | Anderson | |
| 5,287,270 A | 2/1994 | Hardy et al. | |
| 5,319,542 A | 6/1994 | King, Jr. et al. | |
| 5,325,290 A | 6/1994 | Cauffman et al. | |
| 5,326,959 A | 7/1994 | Perazza | |
| 5,329,589 A | 7/1994 | Fraser et al. | |
| 5,336,870 A | 8/1994 | Hughes et al. | |
| 5,341,429 A | 8/1994 | Stringer et al. | |
| 5,347,632 A | 9/1994 | Filepp et al. | |
| 5,383,113 A | 1/1995 | Kight et al. | |
| 5,420,405 A | 5/1995 | Chasek | |
| 5,420,926 A | 5/1995 | Low et al. | |
| 5,453,601 A | 9/1995 | Rosen | |
| 5,455,407 A | 10/1995 | Rosen | |
| 5,465,206 A | 11/1995 | Hilt et al. | |
| 5,477,038 A | 12/1995 | Levine et al. | |
| 5,483,445 A | 1/1996 | Pickering | |
| 5,500,513 A | 3/1996 | Langhans et al. | |
| 5,557,518 A | 9/1996 | Rosen | |
| 5,590,197 A | 12/1996 | Chen et al. | |
| 5,594,910 A | 1/1997 | Filepp et al. | |
| 5,613,012 A | 3/1997 | Hoffman et al. | |
| 5,649,117 A | 7/1997 | Landry | |
| 5,655,089 A | 8/1997 | Bucci | |
| 5,671,279 A | 9/1997 | Elgamal | |
| 5,692,132 A | 11/1997 | Hogan | |
| 5,699,528 A | 12/1997 | Hogan | |
| 5,710,887 A | 1/1998 | Chelliah et al. | |
| 5,710,889 A | 1/1998 | Clark et al. | |
| 5,715,314 A | 2/1998 | Payne et al. | |
| 5,717,989 A | 2/1998 | Tozzoli et al. | |
| 5,723,400 A | 3/1998 | Morini et al. | |
| 5,724,424 A | 3/1998 | Gifford | |
| 5,727,163 A | 3/1998 | Bezos | |
| 5,727,249 A | 3/1998 | Pollin | |
| 5,729,594 A | 3/1998 | Klingman | |
| 5,768,385 A | 6/1998 | Simon | |
| 5,768,521 A | 6/1998 | Dedrick | |
| 5,794,221 A * | 8/1998 | Egendorf | 705/40 |
| 5,815,665 A | 9/1998 | Teper et al. | |
| 5,826,245 A | 10/1998 | Sandberg-Diment | |
| 5,832,089 A | 11/1998 | Kravitz et al. | |
| 5,832,460 A | 11/1998 | Bednar et al. | |
| 5,842,185 A | 11/1998 | Chancey et al. | |
| 5,855,008 A | 12/1998 | Goldhaber et al. | |
| 5,873,072 A | 2/1999 | Kight et al. | |
| 5,884,288 A | 3/1999 | Chang et al. | |
| 5,893,080 A | 4/1999 | McGurl et al. | |
| 5,903,721 A | 5/1999 | Sixtus | |
| 5,903,732 A | 5/1999 | Reed et al. | |
| 5,920,847 A * | 7/1999 | Kolling et al. | 705/40 |
| 5,931,917 A | 8/1999 | Nguyen et al. | |
| 5,943,656 A | 8/1999 | Crooks et al. | |
| 5,956,700 A | 9/1999 | Landry | |
| 5,963,925 A | 10/1999 | Kolling et al. | |
| 5,970,480 A * | 10/1999 | Kalina | 705/37 |
| 5,974,146 A | 10/1999 | Randle et al. | |
| 5,978,780 A | 11/1999 | Watson | |
| 5,987,430 A | 11/1999 | Van Horne et al. | |
| 6,006,200 A | 12/1999 | Boies et al. | |
| 6,009,402 A | 12/1999 | Whitworth | |
| 6,016,509 A | 1/2000 | Dedrick | |
| 6,026,364 A | 2/2000 | Whitworth | |
| 6,029,150 A | 2/2000 | Kravitz | |
| 6,029,151 A | 2/2000 | Nikander | |
| 6,032,133 A | 2/2000 | Hilt et al. | |
| 6,035,285 A | 3/2000 | Schlect et al. | |
| 6,044,362 A | 3/2000 | Neely | |
| 6,047,268 A | 4/2000 | Bartoli et al. | |
| 6,049,687 A | 4/2000 | Smorodinsky | |
| 6,052,674 A * | 4/2000 | Zervides et al. | 705/40 |
| 6,055,567 A | 4/2000 | Ganesan et al. | |
| 6,058,381 A | 5/2000 | Nelson | |
| 6,070,150 A | 5/2000 | Remington et al. | |
| 6,076,075 A | 6/2000 | Teicher | |
| 6,078,907 A | 6/2000 | Lamm | |
| 6,088,688 A | 7/2000 | Crooks et al. | |
| 6,098,053 A | 8/2000 | Slater | |
| 6,128,603 A | 10/2000 | Dent et al. | |
| 6,134,326 A | 10/2000 | Micali | |
| 6,137,884 A | 10/2000 | Micali | |
| 6,163,772 A | 12/2000 | Kramer et al. | |
| 6,167,384 A * | 12/2000 | Graff | 705/35 |
| 6,249,770 B1 | 6/2001 | Erwin et al. | |
| 6,289,322 B1 | 9/2001 | Kitchen et al. | |
| 6,292,789 B1 * | 9/2001 | Schutzer | 705/40 |
| 6,304,857 B1 | 10/2001 | Heindel et al. | |
| 6,334,116 B1 | 12/2001 | Ganesan et al. | |
| 6,360,210 B1 * | 3/2002 | Wallman | 705/36 R |
| 6,378,075 B1 | 4/2002 | Goldstein et al. | |
| 6,460,021 B1 * | 10/2002 | Kirksey | 705/35 |
| 6,856,974 B1 | 2/2005 | Ganesan et al. | |
| 7,177,834 B1 * | 2/2007 | Maestle | 705/38 |
| 7,206,768 B1 * | 4/2007 | deGroeve et al. | 705/54 |
| 7,219,079 B2 * | 5/2007 | Birle et al. | 705/36 T |
| 7,289,322 B2 * | 10/2007 | Chen et al. | 361/695 |
| 7,295,987 B2 * | 11/2007 | Graff | 705/1 |
| 7,383,226 B2 * | 6/2008 | Kight et al. | 705/40 |
| 2001/0056508 A1 | 12/2001 | Arneson et al. | |
| 2002/0016765 A1 | 2/2002 | Sacks | |
| 2002/0059139 A1 | 5/2002 | Evans | |
| 2003/0023552 A1 | 1/2003 | Kight et al. | |

FOREIGN PATENT DOCUMENTS

| | | |
|---|---|---|
| EP | 0779587 | 6/1997 |
| EP | 1229480 | 7/2002 |
| GB | 2102606 | 2/1983 |
| WO | 9931612 | 6/1991 |
| WO | 91/16691 | 10/1991 |
| WO | 95/16971 | 6/1995 |
| WO | 97/18398 | 10/1997 |
| WO | 98/17329 | 8/1998 |
| WO | 98/19566 | 9/1998 |
| WO | 99/07121 | 2/1999 |
| WO | 9910823 | 3/1999 |
| WO | 01/80102 | 10/2001 |

OTHER PUBLICATIONS

IEEE 8439 Personal Communications Aug. 2, (1995) No. 4, New York, US "Netbil: An Internet Commerce System Optimized for Network-Delivered Services", pp. 34-39.

Whaley, Carey, Creating Customer Convenience, Electric Perspectives, v22n6, Nov./Dec. 1997, 2 pages.

Open Financial Exchange Bill Presentment, review copy of specification, 1997.
"Open Financial Exchange Bill Presentment." Open Financial Exchange Specification—1.0.2. Collaborative work of CheckFree Corp., Microsoft Corp., and Intuit, Inc. May 30, 1997, pp. 1-302.
"CheckFree Delivers E-Bill." Internet Week, Sep. 30, 1996, p. 1.
"Luring Customers with Bill Pay." US Banker, Nov. 1997, pp. s16-s20.
"Microsoft and First Data Form Internet Bill Payment Company." America's Community Banker, Aug. 1997, pp. 6-7.
"Utilities, Phone Companies Pilot Electronic Billing." Item Processing Report, Nov. 7, 1996, p. 1.
Goradia, et al. "Net Bill Prototype" (MS Thesis). 1994.
McChesney, Michael C. "Banking in Cyberspace: An Investment in Itself." IEEE Spectrum, Feb. 1997, pp. 54-59.
Orr, Bill. "Microsoft/First Data: The Instant Giant of Internet Bill Payments." ABA Banking Journal, Nov. 1997, p. 95.
Rafter, Michelle. "Pushing the Envelope." Los Angeles Times (Mon. ed.), Feb. 9, 1998, p. D1, Col. 3, vol. 117, No. 71.
Redman, Russell. "Integrion Sets Bill-Pay with VISA Deal." Bank Systems Technology, Nov. 1997, p. 14.
Talmor, Sharona. "Pioneers in e-Commerce." The Banker, Jan. 1998, pp. 69-71.
Wallace, Bob. "Utilities Adopt Web Bill Payment Plans." Computer World, Aug. 25, 1997, pp. 51-52, U31, N34.
Disclosure under 37 C.F.R. 1.56.
"Making Banking Easier // Microsoft Money 97 Aims for Better Online Financial Action." Tulsa World, Oct. 19, 1996, Tulsa, Oklahoma.
Rutherford, "The Check's in the Modem // Bok to Debut Area's First PC Banking." Tulsa World, Jun. 28, 1996, Tulsa, Oklahoma.
Gregg, Leigh. "CUs Plan Electronic Bill Payment." Credit Union Executive, Nov.-Dec. 1997, p. 4 (6), vol. 37, No. 6.
Moynihan, et al. "Taming the Remittance Beast Electronically." Healthcard Financial Management, Mar. 1992, p. 20 (9), vol. 46, No. 3.
Slater, et al. "Giving Receivables an 'Outside' Chance." Healthcard Financial Management, Oct. 1991, p. 56 (6), vol. 45, No. 10.
Notice of Allowance mailed Dec. 27, 2007 for related U.S. Appl. No. 09/387,764, (filed Jul. 26, 1999) which is a continuation-in-part of U.S. Appl. No. 09/017,169.
Non-Final Office Action mailed Jan. 24, 2008 for related U.S. Appl. No. 10/645,521, (filed Aug. 22, 2003) which is a continuation of U.S. Appl. No. 09/301,068.
Final Office Action mailed Mar. 11, 2008 for related U.S. Appl. No. 11/057,233, (filed Feb. 15, 2005) which is a continuation of U.S. Appl. No. 09/301,068.
Non-Final office Action mailed Apr. 15, 2008 for related U.S. Appl. No. 11/066,288, (filed Feb. 28, 2005) which is a continuation of U.S. Appl. No. 11/057,233.
Final Office Action mailed Jul. 16, 2008 for related U.S. Appl. No. 10/645,521, (filed Aug. 22, 2003) which is a continuation of U.S. Appl. No. 09/301,068.
Non-Final Office Action mailed Sep. 24, 2008 for related U.S. Appl. No. 11/066,293, (filed Feb. 28, 2005) which is a continuation of U.S. Appl. No. 11/057,233.
Non-Final Office Action mailed Nov. 18, 2008 for related U.S. Appl. No. 11/534,159, (filed Sep. 21, 2006) which is a continuation of U.S. Appl. No. 09/301,068.
Non-Final Office Action mailed Jan. 12, 2009 for related U.S. Appl. No. 10/645,521, (filed Aug. 22, 2003) which is a continuation of U.S. Appl. No. 09/301,068.
Non-Final Office Action mailed Mar. 30, 2009 for related U.S. Appl. No. 11/066,458, (filed Feb. 28, 2005) which is a continuation of U.S. Appl. No. 11/057,233.
Notice of Allowance mailed Jul. 10, 2009 for related U.S. Appl. No. 10/645,521, (filed Aug. 22, 2003) which is a continuation of U.S. Appl. No. 09/301,068.
Cohen, Jackie. "Electronic Bill Presentment: the Real Killer App?" Bank Technology News, Sep. 1997, vol. 10, No. 9, pp. 25+.

* cited by examiner

INTEGRATED ELECTRONIC PRESENTMENT AND PAYMENT OF BILLS BY DIFFERENT ENTITIES

RELATED APPLICATIONS

This application is a continuation of U.S. application Ser. No. 11/057,233, filed Feb. 15, 2005 now abandoned, which is a continuation of U.S. application Ser. No. 09/301,068, filed Apr. 28, 1999 (now U.S. Pat. No. 6,856,974), which is a continuation of U.S. application Ser. No. 09/017,169, filed Feb. 2, 1998 (now U.S. Pat. No. 6,055,567), the disclosures of which are incorporated herein by reference in its entirety.

FIELD OF THE INVENTION

The present invention relates generally to distributed data networks and, more particularly, to a distributed data accessing technique.

BACKGROUND OF THE INVENTION

There are two prevalent models for electronic bill presentment that are currently used in industry. The first is an aggregation model 10, which is shown in FIG. 1. In its simplest form, the aggregation model 10 includes a customer 12, an aggregator 14, and a plurality of billers 16. The customer 12 can be, for example, an individual person, a family, or a business. The aggregator 14 can be a financial institution (FI) such as, for example, a bank. Alternatively, the aggregator 14 can be a separate entity which acts of behalf of a sponsor 18, which can also be an FI such as a bank. Each biller 16 can be of any billing institution type such as, for example, a local telephone company, a local electric company, a retail outlet, or a national long distance telephone company.

Each biller 16 provides customer-related invoice data to the aggregator 14. The aggregator 14 serves: as an intermediary between each biller 16 and the customer 12 by providing bill presentment directly to the customer 12, potentially on behalf of the sponsor 18.

There are two variants of the aggregation model 10 resulting from the ownership, or "branding", of the presentation experience and the communication channel between the aggregator 14 and the customer 12. In one variant, the aggregator 14 may offer aggregator-branding, thus totally owning both the presentation experience and the communication channel between the aggregator 14 and the customer 12. In the other variant, the aggregator 14 may offer sponsor-branding, thus staying "behind the scenes" in terms of the presentation experience and supporting the communication channel between the aggregator 14 and the customer 12 on behalf of the sponsor 18.

The second prevalent model for electronic bill presentment is a biller direct model 20, which is shown in FIG. 2. In its simplest form, the biller direct model 20 includes a customer 12 and at least one biller 16. In the biller direct model 20, each biller 16 retains the customer-related invoice data and the full relationship with the customer 12 (i.e., the presentation experience and the communication channel). The customer 12 may have software for providing a capability similar to Web browser bookmarking so as to allow easy navigation between billers, and thus some level of virtual aggregation. However, there is no actual aggregation such as with the aggregator 14 of the aggregation model 10 described above.

The above-described models present a dichotomy between a sponsor-centric view and a biller-centric view of bill presentment. That is, the aggregation model 10 allows the aggregator 14 and/or the sponsor 18 to use customer-related invoice data, bill presentment, and the communication channel between the aggregator 14 and the customer 12 for cross-selling or other peripheral services. The biller direct model 20, on the other hand, insures that control of customer-related invoice data, bill presentment, and the communication channel between the biller 16 and the customer 12 remains with the biller 16.

Also, neither of the above-described models adopt a truly customer-centric view. That is, neither of the above-described models allow a customer 12 to interact directly with individual billers 16 while retaining the benefits of interacting with a single aggregator 14 such as, for example, the ability to retain a single authentication and log-in procedure and a common bill presentation framework. Further, neither of the above-described models allow a customer 12 to retain the benefits of interacting with a single aggregator 14 while allowing the aggregator 14, billers 16, and sponsor 18 to retain certain preferences such as, for example, the ability to retain control of customer-related data and a communication channel with each customer 12. Accordingly, it would be desirable to provide a distributed data accessing technique which addresses the above-mentioned shortcomings of the above-described models.

OBJECTS OF THE INVENTION

One object of the present invention is to provide a distributed data accessing technique that allows a customer to interact directly with individual billers while retaining the benefits of interacting with a single aggregator.

Another object of the present invention is to provide a distributed data accessing technique that allows a customer to retain the benefits of interacting with a single aggregator while allowing the aggregator, billers, and sponsor to retain control of customer-related data and a communication channel with each customer.

Another object of the present invention is to provide a distributed data accessing technique that allows complete flexibility as to who is offering bill presentment: billers only, aggregator only (possibly on behalf of one or more sponsors), or some combination of the above.

Another object of the present invention is to provide a distributed data accessing technique that supports an end-to-end audit trail from the initial stages of bill presentment to the final stages of bill payment, which can serve a variety of purposes, including improved customer care.

The above-stated objects, as well as other objects, features, and advantages, of the present invention will become readily apparent from the following detailed description which is to be read in conjunction with the appended drawings.

SUMMARY OF THE INVENTION

According to the present invention, a distributed data accessing technique is provided. The technique can be realized by storing, at a first network station, information identifying data which is available at a second network station. The first network station can be, for example, an electronic payment and customer service entity. The second network station can be, for example, a billing entity such as a utility company. The information identifying the data that is available at the second network station can be, for example, information which indicates that a bill is available at the second network station.

A signal is generated at the first network station. The signal represents the information identifying the available data and linking information to the second network station. The linking information can be, for example, a web site address along with some additional parameters.

The signal is transmitted to a third network station. The third network station can be, for example, a user entity such as a personal computer. The transmitted linking information is operable at the third network station to establish a network link over which the identified available data is transmittable from the second network station to the third network station. That is, the third network station can invoke the linking information so as to create, for example, a link to the web site of a utility company.

The signal is typically generated in response to a request for data. Such a request can include an identification of a user so that the user can be authenticated. The signal is then generated after the user is authenticated. The request is typically received from the third network station. The request, as well as any other events that occur between the various network stations, can be logged at the first network station. The logged events can then be accessed by an entity located outside of the network such as, for example, a centralized customer service center.

The identified available data is typically stored at the second network station. However, the identified available data can be provided to the second network station by an entity located outside of the network. Such an outside entity could be, for example, a legacy billing system or an established billing aggregator.

The first network station can receive a notification that the identified available data was transmitted from the second network station to the third network station. The identified available data is preferably transmitted from the second network station directly to the third network station over the network link. The identified available data can be transmitted from the second network station to the third network station so as to be displayed in a presentation format. The presentation format can be, for example, an internet web page or a frame of an internet web page.

In accordance with a further aspect of the invention, the identified available data can be identified available first data, the linking information can be first linking information, the network link can be a first network link, and further information identifying second data which is available at a fourth network station can be stored at the first network station. Similar to the second network station, the fourth network station can be, for example, a billing entity such as a retailer. The information identifying the second data that is available at the fourth network station can be, for example, information which indicates that a bill is available at the fourth network station.

The signal that is generated at the first network station can further represent the further information identifying the available second data and second linking information to the fourth network station. As with the first linking information, the second linking information can also be, for example, a web site address.

The signal can again be transmitted to the third network station, and the transmitted second linking information is operable at the third network station to establish a second network link over which the identified available second data is transmittable from the fourth network station to the third network station. The third network station can therefore invoke the second linking information so as to create, for example, a link to the-web site of the retailer.

The signal can again be generated in response to a request for data. The request can include an identification of a user so that the user can be authenticated for use with more than one network station. That is, only a single authentication procedure is required for use with both the second and the fourth network stations. As before, the is request, as well as any other events that occur between the various network stations can be logged at the first network station. The logged events can then be accessed by an entity located outside of the network such as, for example, a centralized customer service center.

The identified available second data is typically stored at the fourth network station. However, as with the second network station, the identified available second data can be provided to the fourth network station by an entity located outside of the network. Again, such an outside entity could be, for example, a legacy billing system or an established billing aggregator.

The first network station can receive a first notification that the identified available first data was transmitted from the second network station to the third network station, and a second notification that the identified available second data was transmitted from the fourth network station to the third network station. The identified available first data is preferably transmitted from the second network station directly to the third network station, and the identified available second data is preferably transmitted from the fourth network station directly to the third network station. Both the identified available first data and the identified available second data can be transmitted to the third network station so as to be displayed in a presentation format. The presentation format can be, for example, an internet web page or a frame of an internet web page. It should be noted that the identified available first data and the identified available second data can be presented in separate frames of an internet web page at the same time.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
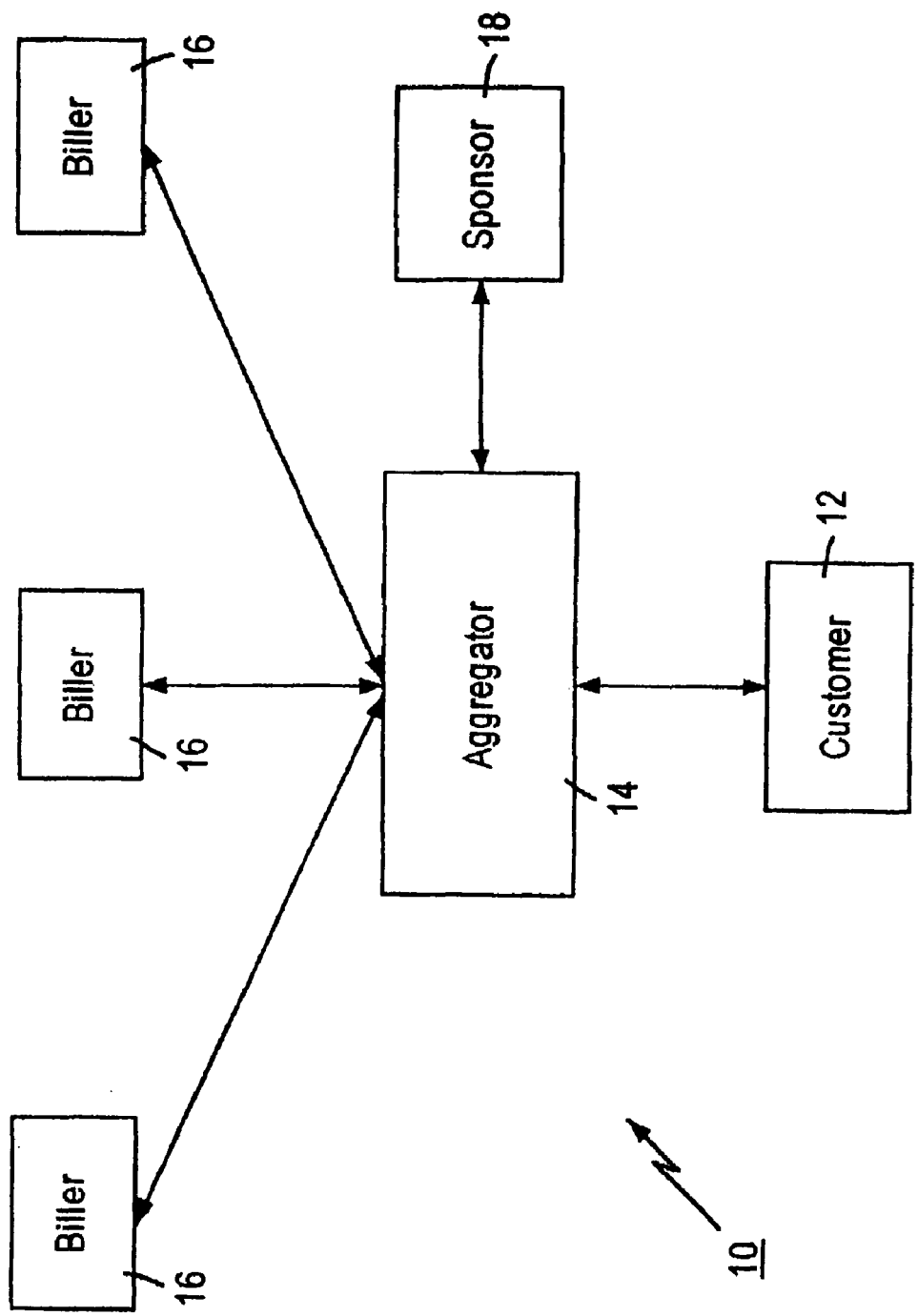
FIG. 1 is an aggregation model for electronic bill presentment.
Figure 2:
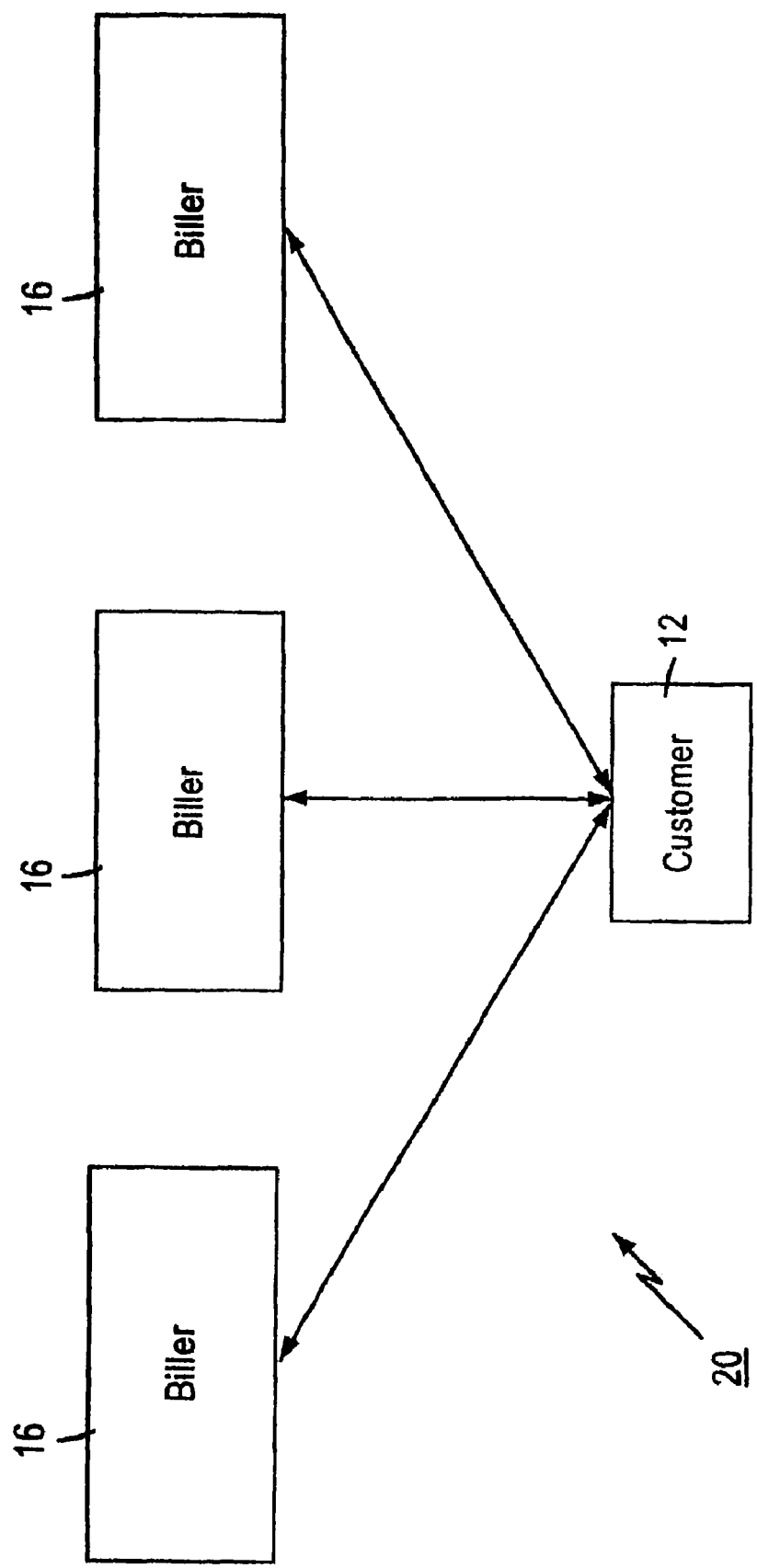
FIG. 2 is a biller direct model for electronic bill presentment.
Figure 3:
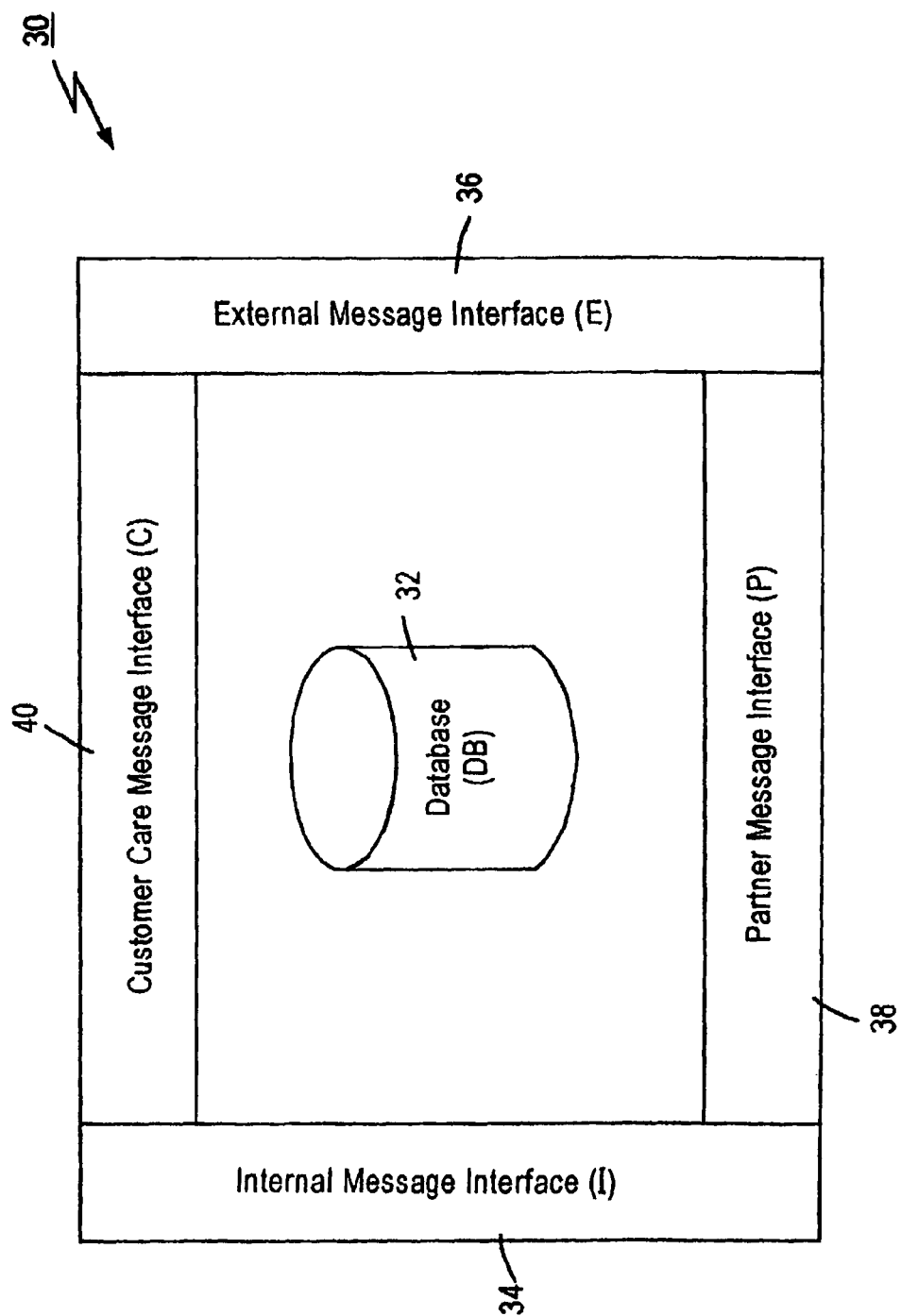
FIG. 3 is an infrastructure diagram of a distributed database entity in accordance with the present invention.

Referring to FIG. 3, there is shown an infrastructure diagram of a distributed database entity 30 in accordance with the present invention. The distributed database entity 30 comprises a database component 32 and a plurality of message interfaces 34-40 for facilitating communication between the database component 32 and other distributed database entities and system components. The database component 32 typically contains data that is controlled or "owned" by the controller or "owner" of the distributed database entity 30. For example, if the distributed database entity 30 is owned by a financial institution (FI) such as a bank, then the database component 32 could contain information such as checking and savings account balances. It should be noted, however, that the database component 32 can also contain data from other distributed database entities and system components, as will be described in detail below.

The plurality of message interfaces 34-40 includes an internal message interface 34, an external message interface 36, a partner message interface 38, and a customer care message interface 40. The internal message interface 34 defines messages that are used to communicate and query data between the given distributed database entity 30 and other distributed database entities, or other system components having an internal message interface. For example, in a bill presentment and payment system, communication between a banking entity and a billing entity may be required. The external message interface 36 defines messages that are used to communicate and query data between the given distributed database entity 30 and any existing system(s) that are directly related to the given distributed database entity 30. For example, an FI such as a bank can have an existing direct deposit account (DDA) system. The partner message interface 38 defines messages that are used to communicate and query data between the given distributed database entity 30 and any existing system(s) that are indirectly related to the given distributed database entity 30. For example, in a bill presentment and payment system, communication with an established billing aggregator may be necessary to satisfy customer demands. The customer care message interface 40 defines messages that are used to communicate and query data between the given distributed database entity 30 and a customer care entity. For example, in a bill presentment and payment system, a billing entity may allow a third party to access bill data in order to provide feedback to bill customers. It should be noted that all of the above-described interfaces will be described in greater detail below.

Figure 4:
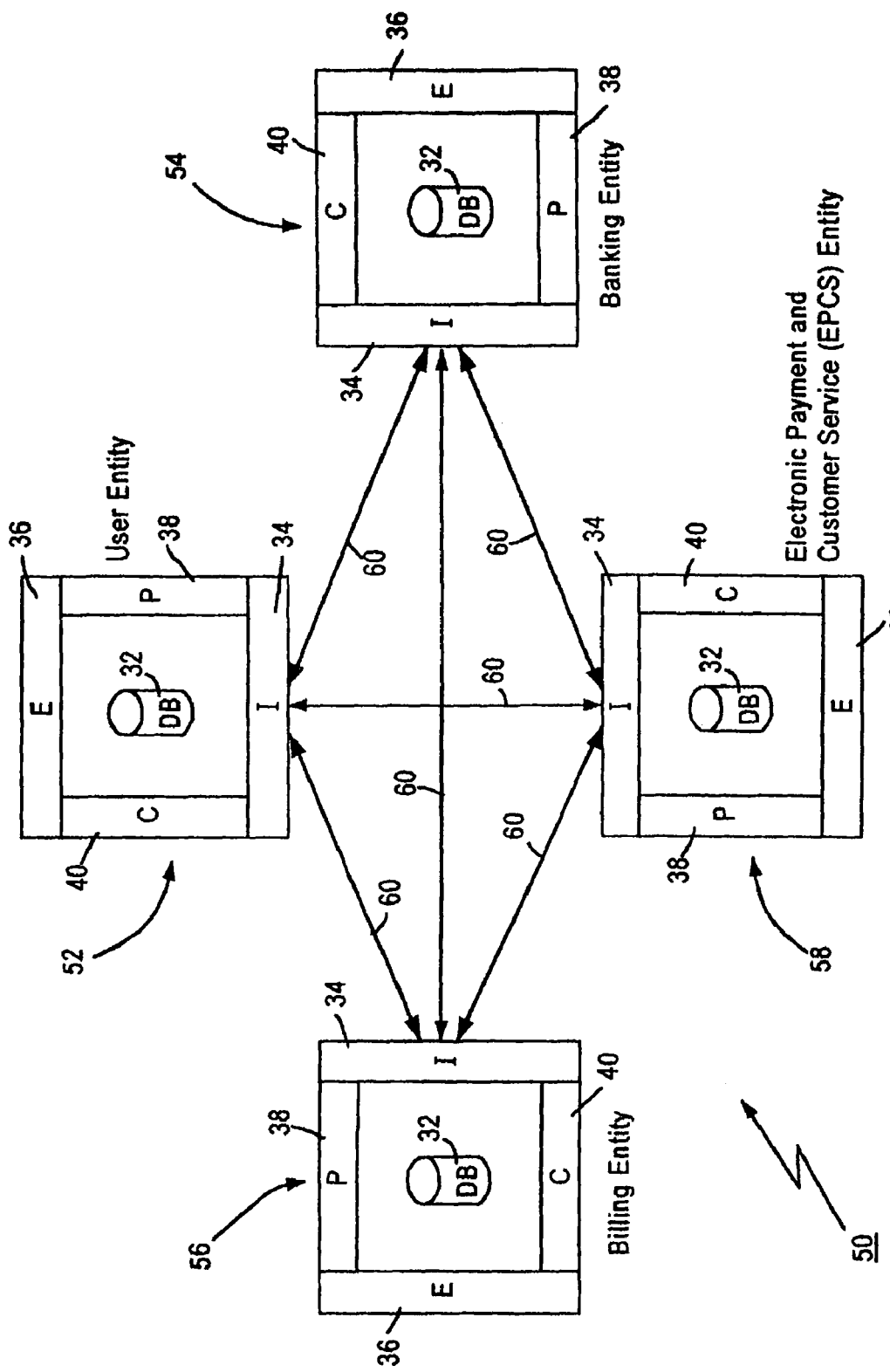
FIG. 4 is a schematic diagram of an electronic bill presentment and payment system in accordance with the present invention.

Referring to FIG. 4, there is shown a schematic diagram of a versatile electronic bill presentment and payment system 50 in accordance with the present invention. The system 50 comprises a user entity 52, a banking entity 54, a billing entity 56, and an electronic payment and customer service (EPCS) entity 58. For purposes of this detailed description, the user entity 52, the banking entity 54, the billing entity 56, and the EPCS entity 58 are each distributed database entities 30 as defined above. Thus, the user entity 52, the banking entity 54, the billing entity 56, and the EPCS entity 58 each has a database component 32, an internal message interface 34, an external message interface 36, a partner message interface 38, and a customer care message interface 40. It should be noted, however, that the user entity 52, the banking entity 54, the billing entity 56, and the EPCS entity 58 are not required to have a database component 32, an internal message interface 34, an external message interface 36, a partner message interface 38, and a customer care message interface 40. That is, the user entity 52, the banking entity 54, the billing entity 56, and the EPCS entity 58 are only required to have an internal message interface 34 so that communications can take place between each entity.

At this point it should be noted that, although only a single user entity 52, banking entity 54, billing entity 56, and EPCS entity 58 is shown in the system 50, it is common to have a plurality of such entities in an actual versatile electronic bill presentment and payment system in accordance with the present invention.

As previously described, an internal message interface 34 defines messages that are used to communicate and query data between distributed database entities. Thus, since the user entity 52, the banking entity 54, the billing entity 56, and the EPCS entity 58 are all distributed database entities, they all communicate through internal message interfaces 34. The communications are performed over interconnections 60, which can be electrical wire, optical fiber, or microwave-based interconnections.

At this point it should be noted that each internal message interface 34, as well as each external message interface 36, partner message interface 38, and customer care message interface 40, can be implemented using any number of existing message-based communication systems such as, for example, a TCP/IP message-based communication system running on the infrastructure of the internet. Alternatively, the internal message interfaces 34, the external message interfaces 36, the partner message interfaces 38, and the customer care message interfaces 40 could be implemented with proprietary messaging software on a private network or intranet. It should also be noted that there are no requirements as to the nature of the messaging protocol, or any middleware used to support the messaging.

The user entity 52 is typically a personal computer (PC) that is directly connected to the system 50, or is connected to the system 50 through a network server. Thus, the database component 32 associated with the user entity 52 can be located on the PC (e.g., a traditional "fat" client), or on the network server (e.g., an HTML browser client). It should be noted that the database component 32 associated with the user entity 52 can also be located in one of the other distributed database entities, which can download data to the user entity 52 (e.g., a Java client). It should also be noted that the database component 32 associated with the user entity 52 can be distributed among all three of the above-listed locations, owing to the distributed nature of each database component 32. Thus, each database component 32 should not be thought of as a single, monolithic database. Rather, each database component 32 is better described as a distributed repository of data categorized by the entity that "owns" the data.

Wherever it is located, the database component 32 associated with the user entity 52 stores data that is related to the type of user interface (UI) that is being presented to a subscriber of the system 50. For example, the database component 32 associated with the user entity 52 can store data that is related to the particular type of presentation technology being used (e.g., a "fat" client, an HTML browser client, or a Java client), a specific application, or a particular version. The database component 32 associated with the user entity 52 can also store data that is related to a particular computing session such as, for example, the existence of a computing session and/or the duration of a computing session. The database component 32 associated with the user entity 52 can further store subscriber authentication data, which is described in detail below.

The main function of the user entity 52 is to build a UI using data obtained from the other distributed database entities, and then present the UI to a subscriber of the system 50. The presentation of the UI to a subscriber is dependent upon the particular type of presentation technology being used (e.g., a "fat" client, an HTML browser client, or a Java client). For example, a UI for a Java client requires that presentation data be downloaded from one of the other distributed database entities.

Other functions of the user entity 52 include storing certain data locally so as to facilitate off-line editing and viewing, maintaining a state in a connectionless environment (e.g., an HTTP environment), and sensing the availability of software updates and managing their subsequent application. All of these functions depend on the nature of the client (e.g., a "fat" client, an HTML browser client, or a Java client). As previously indicated, another function of the user entity 52 includes storing subscriber authentication data (e.g., a security ticket) that is used to gain access to other distributed database entities in the system 50.

The banking entity 54, which is typically an FI such as, for example, a bank, is generally viewed as a primary point of presence for a subscriber to the system 50, typically providing an appearance of aggregation to the subscriber. This view is held primarily due to the trust that consumers typically place in a bank brand, and the fact that bank customers who already bank online are also likely to want to receive bills online. Thus, in the following discussion, the banking entity 54 is assumed to be the aggregator of the system 50. It should be noted, however, that any one of the other entities could also be the aggregator of the system 50 in accordance with the present invention. There are several factors which can be used to determine aggregator status such as, for example, market clout.

The banking entity 54 typically gains access to the system 50 through a network server. Thus, the database component 32 associated with the banking entity 54 can be located in the network server. It should be noted that the database component 32 associated with the banking entity 54 can also be located in a system associated with the banking entity 54 such as, for example, a DDA system. Such a DDA system could be accessed through the external message interface 36 of the banking entity 54, as described in detail below. It should further be noted that the database component 32 associated with the banking entity 54 can also be located in one of the other distributed database entities, or be distributed among many of the above-mentioned locations, owing to the distributed nature of each database component 32.

Wherever it is located, the database component 32 associated with the banking entity 54 stores bank-specific subscriber profile data profile such as, for example, subscriber names and addresses and subscriber account numbers. The database component 32 associated with the banking entity 54 can also store account information such as, for example, static account information (e.g., lease rate, principle), and dynamic account information (e.g., balance). The database component 32 associated with the banking entity 54 can further store profile data specifically associated with the FI such as, for example, graphics, business rules, banking-related transaction histories, and aggregation relationships such as those between the FI and billers.

Since it is likely that the system 50 will be used with existing banking systems such as, for example, an existing DDA system, one of the main functions of the banking entity 54 is the continuation of current banking and bill payment functionality including the maintaining of customer profiles and already existing interfaces. In its role as aggregator, the banking entity 54 also provides data to the user entity 52 to be used for the creation of a navigation portion of a UI. For an HTML browser client, this data would be used to create a navigation frame, but not a content specific frame. It should be noted that the banking entity 54 can also provide data to the user entity 52 to be used for the creation of a UI for traditional banking and bill payment.

Since the banking entity 54 is generally viewed as the primary point of presence for a subscriber to the system 50, the banking entity 54 also functions as the likely, but not exclusive, entry point for subscriber sign-on. Thus, the banking entity 54 typically controls the sign-on and authentication procedures for subscribers through the user entity 52. It should be noted that the banking entity 54 typically works in conjunction with the EPCS entity 58 in controlling the authentication procedure, as described in detail below.

Another function of the banking entity 54 includes tracking bank related events and storing them in an event tracking database, which is typically associated with the EPCS entity 58, as also described in detail below.

The billing entity 56 is typically a biller such as, for example, a utility company. The billing entity 56 typically gains access to the system 50 through a network server. Thus, the database component 32 associated with the billing entity 56 can be located in the network server. It should be noted that the database component 32 associated with the billing entity 56 can also be located in a system associated with the billing entity 56 such as, for example, a legacy billing system. Such a legacy billing system could be accessed through the external message interface 36 of the billing entity 56, as described in detail below. It should further be noted that the database component 32 associated with the billing entity 56 can also be located in one of the other distributed database entities, or be distributed among many of the above-mentioned locations, owing to the distributed nature of each database component 32.

Wherever it is located, the database component 32 associated with the billing entity 56 stores biller-specific subscriber profile data such as, for example, subscriber names and addresses and subscriber account numbers and types (e.g., business vs. residential phone line). The database component 32 associated with the billing entity 56 also stores billing data for use by the user entity 52 in building the UI for the subscriber. The billing data can include bill availability data, detailed billing data, ads and other cross-sale displays and links, and bill payment terms and conditions.

The database component 32 associated with the billing entity 56 can also store biller transaction history such as, for example, bill data manipulation (e.g., viewing, searching, sorting), and cross-sell events. The database component 32 associated with the billing entity 56 can further store biller profile data such as, for example, graphics, business rules, and relationships with aggregators such as banks.

The main function of the billing entity 56 is to provide billing data to the user entity 52 for use in creating the UI for the subscriber. The billing entity 56 also provides bill availability data to an aggregator database, whether it is located in the banking entity 54, the EPCS entity 58, or another entity, to provide notice of bill availability to subscribers. The billing entity 56 can also access legacy billing systems through the external message interface 36 of the billing entity 56, as indicated above.

Another function of the billing entity 56 includes tracking biller-related events and storing them in an event tracking database, which is typically associated with the EPCS entity 58, as described in detail below.

Figure 5:
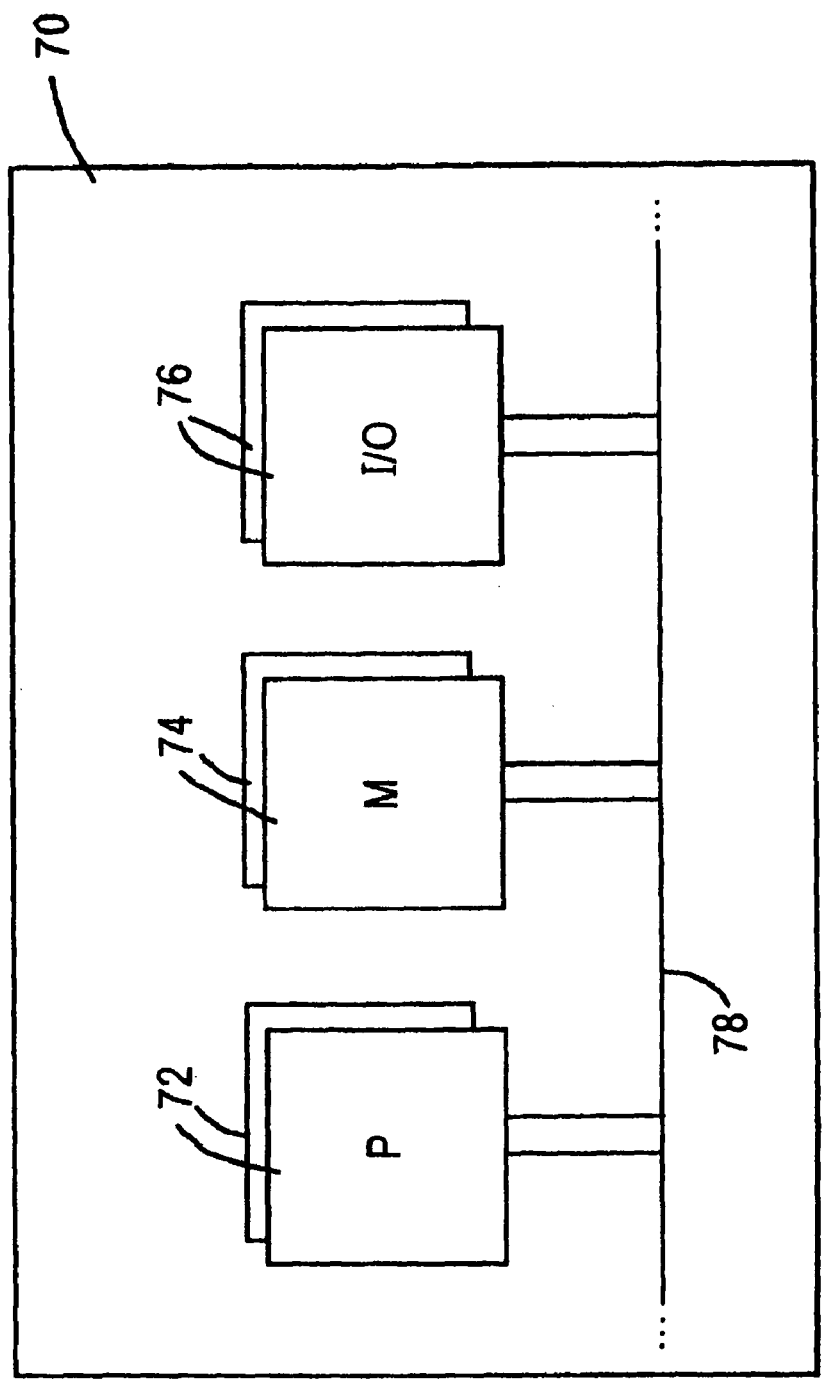
FIG. 5 is a schematic diagram of an electronic payment and customer service (EPCS) entity in accordance with the present invention.

The EPCS entity 58 can generally be described in terms of a data processing system 70, such as shown in FIG. 5. The data processing system 70 preferably comprises at least one processor (P) 72, memory (M) 74, and input/output (I/O) interface 76, which are connected to each other by a bus 78, for implementing the functions of the EPCS entity 58, as described in detail below.

Referring again to FIG. 4, the EPCS entity 58 typically gains access to the system 50 through a network server. Thus, the database component 32 associated with the EPCS entity 58 can be located in the network server. It should be noted that the database component 32 associated with the EPCS entity 58 can also be located in a system associated with the EPCS entity 58 such as, for example, a legacy aggregating system. Such a legacy aggregating system could be accessed through the external message interface 36 of the EPCS entity 58, as described in detail below. It should further be noted that the database component 32 associated with the EPCS entity 58 can also be located in one of the other distributed database entities, or be distributed among many of the above-mentioned locations, owing to the distributed nature of each database component 32.

Wherever it is located, the database component 32 associated with the EPCS entity 58 stores bill payment-specific subscriber profile data such as, for example, subscriber names and addresses, subscriber DDA account numbers, and subscriber credit ratings. The database component 32 associated with the EPCS entity 58 also stores bill payment warehouse data such as, for example, user-specific payees, single occurrence payments, and recurring payments/models.

As previously described, both the banking entity 54 and the billing entity 56 track and store events in an event tracking database. This event tracking database is typically located in the database component 32 associated with the EPCS entity 58. The event tracking data that is stored typically comprises event summaries and links to other databases, perhaps residing at other entities, which provide event details and/or an audit trail.

The database component 32 associated with the EPCS entity 58 also stores bill payment transaction histories, and system subscriber profile data such as, for example, metadata about subscribers and metadata about subscribers' relationships to other entities (e.g., a list of billers that a subscriber has enabled). The database component 32 associated with the EPCS entity 58 further stores billing-related profile information on the system aggregator and billers such as, for example, metadata about billing arrangements (e.g., flat rate, per subscriber, event-driven, etc.), and aggregation data such as, for example, new bill availability and messages or special announcements available from the billing entity 56. The database component 32 associated with the EPCS entity 58 still further stores security data such as, for example, required sign-on information and macro-level authorizations. The database component 32 associated with the EPCS entity 58 additionally stores customer service data such as, for example, FAQ's, FI and biller contact information, and problem resolution data.

The EPCS entity 58 is the glue that holds the distributed database entities together. The EPCS entity 58 accomplishes this by functioning as an integration agent by maintaining bill payment profiles and warehouse data, aggregating bill availability and status data (but not bill content or presentation), and maintaining an event tracking database (or audit trail) that can be accessed by all of the database entities. Also, in order to facilitate a single point of sign-on, the EPCS entity 58 functions as the authentication gate keeper. This doesn't mean to imply that the EPCS entity 58 necessarily maintains user identification numbers and/or passwords. However, it does imply that the EPCS entity 58 accepts sign-on requests and doles out authentication "tickets" in response, in conjunction with the banking entity as described above.

It should be noted that, like user identification numbers and passwords, other data elements, like event details, may end up being virtually aggregated by the EPCS entity 58, but may still physically reside in a distributed manner across several of the database entities.

It should also be noted that the EPCS entity 58 may also route e-mail messages to and from the various database entities, as well as store e-mail messages sent to and from the various database entities.

As previously described, an internal message interface 34 defines messages that are used to communicate and query data between distributed database entities. As also previously described, each internal message interface 34 can be implemented using any number of existing message-based communication systems, or with proprietary messaging software on a private network or intranet. Furthermore, the message specification or file format can be either standard (i.e., open) or proprietary. With this mind, the following types of messages are examples of messages which may be employed to implement an internal message interface 34 in accordance with the present invention.

Depending upon the nature of the presentation technology being used (e.g., a "fat" client, an HTML browser client, or a Java client), the user entity 52 may need to process an internal message to store a security ticket for later use in gaining access to other distributed database entities in the system 50. The user entity 52 may also need to process an internal message to update any resident software. The user entity 52 may further need to process an internal message containing various types of information (assuming a push model). The user entity 52 may additionally need to process internal e-mail messages such as, for example, those for receiving data from other database entities.

The banking entity 54 will process an internal message to add/update/delete/retrieve FI branding information, as well as an internal message to add/update/delete an entry from a list of billers that have been aggregated. The banking entity 54 will also process an internal message to activate a subscriber for home banking via a messaging protocol, which can be an existing messaging protocol such as, for example, OFX or a batch process. The banking entity 54 will further process an internal message to query/update bank subscriber profile data for purposes of customer care. The banking entity 54 will still further process an internal message to query bank transaction history for customer care and for linking to the event tracking database. The banking entity 54 will still further process an internal message to retrieve a list of billers available under the FI sponsor umbrella. An alternative to this is to place the list of billers available under the FI sponsor umbrella in an aggregation database. However, placing the list of billers available under the FI sponsor umbrella allows the EPCS entity 58 to tailor the list by FI sponsor. The banking entity 54 will additionally process internal e-mail messages such as, for example, those for sending data to other database entities, receiving data from other database entities, and broadcasting data to other database entities.

The billing entity 56 will process an internal message to add/update/delete/retrieve biller branding information, as well as an internal message to activate a subscriber for electronic bill presentment via a messaging protocol, which can be an existing messaging protocol such as, for example, OFX or a batch process. The billing entity 56 will also process an internal message to retrieve bill availability data, retrieve bill detail data, and retrieve bill presentation specifications or content. For example, the retrieved data could be URL links to ads and notices, HTML data, or OFX data. The billing entity 56 will further process an internal message to query/update biller subscriber profile data for purposes of customer care. The billing entity 56 will still further process an internal message to query biller transaction history for customer care and for linking to the event tracking database. The billing entity 56 will additionally process internal e-mail messages such as, for example, those for sending data to other database entities, receiving data from other database entities, and broadcasting data to other database entities.

The EPCS entity 58 will process internal event tracking messages. Such event tracking messages are used to gain access to two types of information in the event tracking database: summary data and a link to another database entry that can provide more detail. Such detail includes subscriber enrollment data, subscriber service activation data (e.g., biller, bill payment, banking, etc.), sign-on data, bill availability data, bill viewed data, bill payment generated data (optionally associated with presented bill data), subsequent bill payment events data (e.g., submitted, processed, failed, cleared, remittance received by biller, etc.), cross-sell events data (e.g., ad/offer viewed, ad/offer clicked, product/service purchased), terms & conditions viewed data, e-mail created/read/deleted data.

The EPCS entity 58 will also process an internal messages related to subscriber profile data such as, for example, to add/modify/delete/read subscriber profile data, often as a function of the events listed above (e.g., enrollment, activation, etc.).

The EPCS entity 58 will also process internal security messages. Such internal security messages may relate to authentication, which result in the EPCS entity 0.58 issuing a security ticket. It should be noted that an authentication request does not have to come as a result of a subscriber "surfing" to the network server of the banking entity 54. It may be initiated if a subscriber tries to gain access to the billing entity 56, and thereby not even contacting the banking entity 54. The point being that with a security ticket a subscriber is generally allowed to freely traverse any database entity in the system 50 without going through repeated sign-on procedures.

An internal security message may also relate to macro-level authorization, wherein a security ticket may contain the credentials to allow a subscriber access to a particular billing entity, but doesn't address micro-level authorization issues such as allowed operations.

An internal security message may also relate to getting a security ticket without authentication. Such a message will originate from a trusted party (e.g., an FI performing its own authentication). Therefore, a security ticket is provided without performing an authentication.

It should be noted that the use of a security ticket enables, but does not mandate, a single sign-on procedure. In other words, a database entity such as, for example, the billing entity 56 may, for whatever reason, require additional authentication information.

The EPCS entity 58 will further process internal messages relating to aggregation data. For example, an EPCS entity 58 will process an internal message to create a link to summary or detailed bill information, or to create a link to message, notice, ad, or some other kind of non-bill information that is available from the billing entity 56.

The EPCS entity 58 will still further process an internal message to query/update bill payment transaction history for purposes of customer care.

The EPCS entity 58 will additionally process internal e-mail messages such as, for example, those associated with routing e-mail, picking-up e-mail, and querying and e-mail mailbox.

The EPCS entity 58 may also process internal messages related to data mining. Such messages are handled very carefully with respect to privacy, perhaps even providing an ACL or other mechanisms to ensure privacy. The results of such messages may be delivered out of band (e.g., by batch).

As previously described, an external message interface 36 defines messages that are used to communicate and query data between a given distributed database entity 30 and any existing system(s) that are directly related to the given distributed database entity 30. As also previously described, each external message interface 36 can be implemented using any number of existing message-based communication systems, or with proprietary messaging software on a private network or intranet. Furthermore, the message specification or file format can be either standard (i.e., open) or proprietary.

Figure 6:
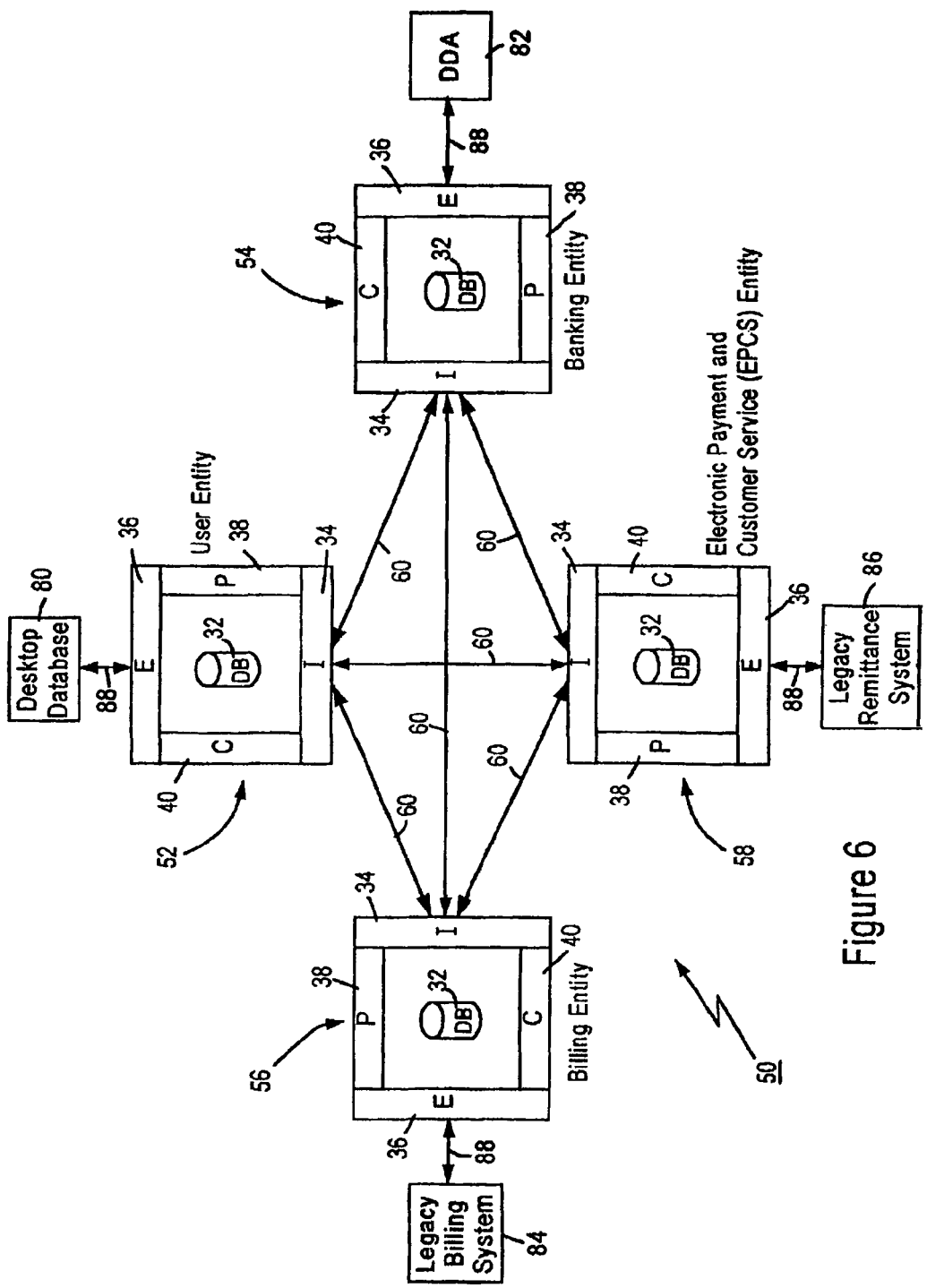
FIG. 6 is a schematic diagram of the electronic bill presentment and payment system shown in FIG. 4, extended to include certain associated directly related systems.

Referring to FIG. 6, there is shown a schematic diagram of the versatile electronic bill presentment and payment system 50, along with some associated directly related systems. The associated directly related systems comprise a desktop database 80, a DDA system 82, a legacy billing system 84, and a legacy remittance system 86. The communications between the various database entities and their associated directly related systems are performed over interconnections 88, which can be electrical wire, optical fiber, or microwave-based interconnections.

Depending upon the nature of the presentation technology being used (e.g., a "fat" client, an HTML browser client, or a Java client), the user entity 52 may need to process an external message in order to communicate with an existing system such as, for example, the desktop database 80. To support such a legacy system, it may be necessary to implement the external message interface 36 of the user entity 52 in the context of an existing, and possibly extended, protocol specification, such as Gold, NPC, or OFX.

The banking entity 54 will process external messages to and from an existing system such as, for example, the DDA system 82 in order to query and update information such as, for example, subscriber profile data, subscriber account data, out-of-band (e.g., ATM) account activity, and statement history. It's also conceivable that the banking entity 54 would need to interface with other banking systems (e.g., stops). Thus, the external message interface 36 of the banking entity 54 is a key feature of the versatile electronic bill presentment and payment system 50.

The billing entity 56 will process external messages to and from an existing system such as, for example, the legacy billing system 84 in order to query and update information such as, for example, subscriber profile data, subscriber account data, account activity, and statement history. Most of this data is industry, if not biller, specific. Thus, the external message interface 36 of the billing entity 56 is a key feature of the versatile electronic bill presentment and payment system 50.

The EPCS entity 58 will process external messages to and from an existing system such as, for example, the legacy remittance system 86. The legacy remittance system 86 could be, for example, ACH, RPP, RPS, or Direct Send.

As previously described, a partner message interface 38 defines messages that are used to communicate and query data between a given distributed database entity 30 and any existing system(s) that are indirectly related to the given distributed database entity 30. As also previously described, each partner message interface 38 can be implemented using any number of existing message-based communication systems, or with proprietary messaging software on a private network or intranet. Furthermore, the message specification or file format can be either standard (i.e., open) or proprietary.

Figure 7:
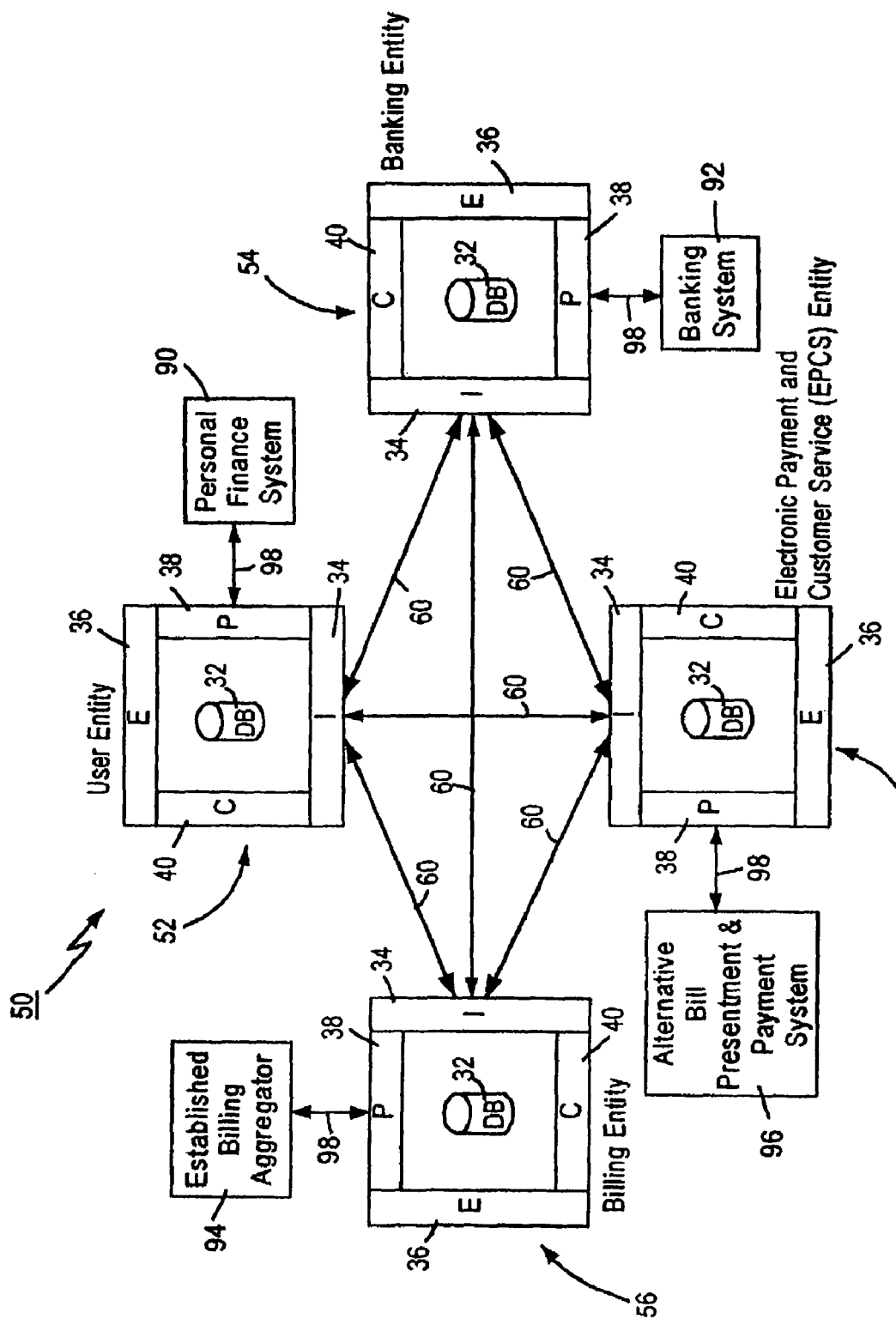
FIG. 7 is a schematic diagram of the electronic bill presentment and payment system shown in FIG. 4, extended to include certain associated indirectly related systems.

Referring to FIG. 7, there is shown a schematic diagram of the versatile electronic bill presentment and payment system 50, along with some associated indirectly related systems. The associated indirectly related systems comprise a personal finance system 90, a banking system 92, an established billing aggregator 94, and an alternative bill presentment and payment system 96. The communications between the various database entities and their associated indirectly related systems are performed over interconnections 98, which can be electrical wire, optical fiber, or microwave-based interconnections.

Depending upon the nature of the presentation technology being used (e.g., a "fat" client, an HTML browser client, or a Java client), the user entity 52 may need to process a partner message in order to communicate with a partner such as, for example, the personal finance system 90. The personal finance system 90 could be, for example, a personal financial manager (PFM) software package such as, for example, Quicken or Money.

The banking entity 54 will process partner messages to and from a partner such as, for example, the banking system 92.

The billing entity 56 will process partner messages to and from a partner such as, for example, the established billing aggregator 94. Such a partner relationship may be required if a large group of subscribers are using the established billing aggregator 94, and thereby have the leverage to demand that all of their bills come through the established billing aggregator 94. The established billing aggregator 94 is essentially treated as a proxy for the billers that it represents. Thus, subscribers to the established billing aggregator 94 will have equal footing as subscribers to the present system 50. This means that subscribers to the established billing aggregator 94 will receive the same event tracking, customer service, and payment processing functionality as subscribers to present system 50. Of course, to gain the additional functionality provided by the present system 50, the established billing aggregator 94, or someone acting on their behalf, will need to provide the same programming support that is required of any biller participating in the present system 50.

To present a bill generated by the established billing aggregator 94, the present system 50 would, for example, receive bill availability data and the URL of a web server of the established billing aggregator 94, and the billing entity 56 would then point to the web server of the established billing aggregator 94 to get an HTML presentation of detailed bill data. In this scenario, the partner message interface 38 would be essentially the same as an internal message interface 34, but possibly with added bulk transfer capability.

The EPCS entity 58 will process partner messages to and from a partner such as, for example, the alternative bill presentment and payment system 96. Such a partner relationship may be required if a billing entity 56 has a subscriber base that is split between using the present system 50 and the alternative bill presentment and payment system 96. In such a scenario, the present system 50 could function as a billing aggregator for the alternative bill presentment and payment system 96, and vice-versa. However, the alternative bill presentment and payment system 96 and its subscribers would not receive any of the benefits of the messaging functionality provided by the present system 50. Only the minimum amount of functionality would be provided. That is, the partner message interface 38 would only provide what is required to present bills through the alternative bill presentment and payment system 96, and not offer any of the advantages provided by the present system 50. The goal being to have the billing entity 56 encourage all of its subscribers to access bills through the present system 50.

It should be noted that the EPCS entity 58 will typically require the capabilities of a billing entity 56 in order to present bills to and from the alternative bill presentment and payment system 96.

As previously described, a customer care message interface 40 defines messages that are used to communicate and query data between a given distributed database entity 30 and a customer care entity. As also previously described, each customer care message interface 40 can be implemented using any number of existing message-based communication systems, or with proprietary messaging software on a private network or intranet. Furthermore, the message specification or file format can be either standard (i.e., open) or proprietary.

Figure 8:
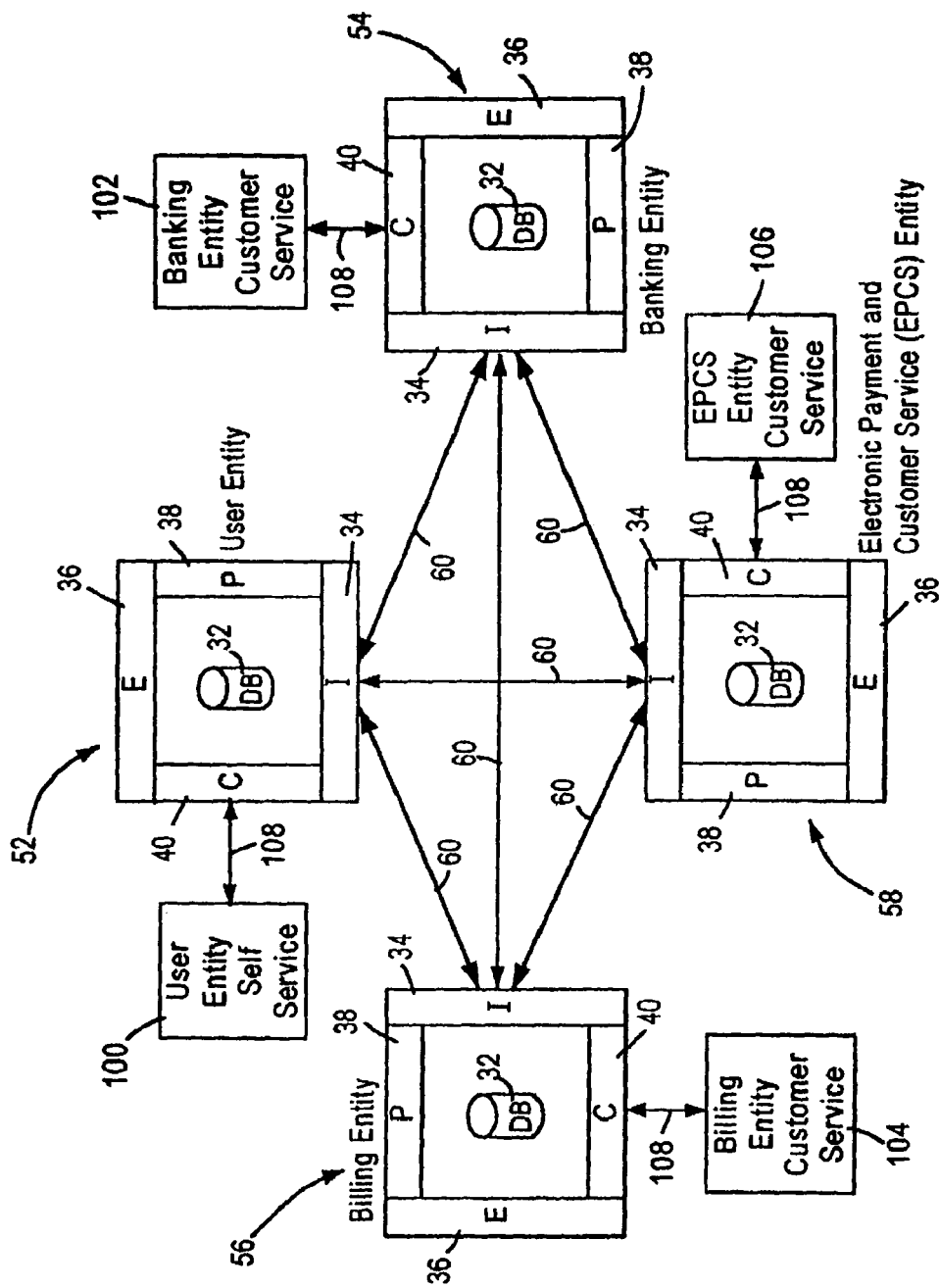
FIG. 8 is a schematic diagram of the electronic bill presentment and payment system shown in FIG. 4, extended to include certain associated customer care entities.

Referring to FIG. 8, there is shown a schematic diagram of the versatile electronic bill presentment and payment system 50, along with some associated customer care entities. The associated customer care entities comprise a user entity self service center 100, a banking entity customer service center 102, a billing entity customer service center 104, and an EPCS customer service center 106. The communications between the various database entities and their associated customer care entities are performed over interconnections 108, which can be electrical wire, optical fiber, or microwave-based interconnections.

Depending upon the nature of the presentation technology being used (e.g., a "fat" client, an HTML browser client, or a Java client), the user entity 52 may need to process a customer care message in order to communicate with a customer care entity such as, for example, the user entity self service center 100. The user entity self service center 100 could be, for example, a self service diagnostic tool.

The banking entity 54 will process customer care messages from a customer care entity such as, for example, the banking entity customer service center 102. A customer care message may be a request for data or a request to modify existing data. The banking entity 54 will process such customer care messages by providing the requested data or providing a confirmation that the existing data has been modified, respectively, to the banking entity customer service center 102. The banking entity customer service center 102 could be, for example, a third party telemarketing group that is allowed access to banking and overall system data in order to provide feedback to system subscribers.

The billing entity 56 will process customer care messages from a customer care entity such as, for example, the billing entity customer service center 104. A customer care message may be a request for data or a request to modify existing data. The billing entity 56 will process such customer care messages by providing the requested data or providing a confirmation that the existing data has been modified, respectively, to the billing entity customer service center 104. The billing entity customer service center 104 could be, for example, a third party telemarketing group that is allowed access to billing and overall system data in order to provide feedback to system subscribers.

The EPCS entity 58 will process customer care messages from a customer care entity such as, for example, the EPCS entity customer service center 106. A customer care message may be a request for data or a request to modify existing data. The EPCS entity 58 will process such customer care messages by providing the requested data or providing a confirmation that the existing data has been modified, respectively, to the EPCS entity customer service center 106. The EPCS entity customer service center 106 could be, for example, a third party telemarketing group that is allowed access to event and overall system data in order to provide feedback to system subscribers.

Figure 9:
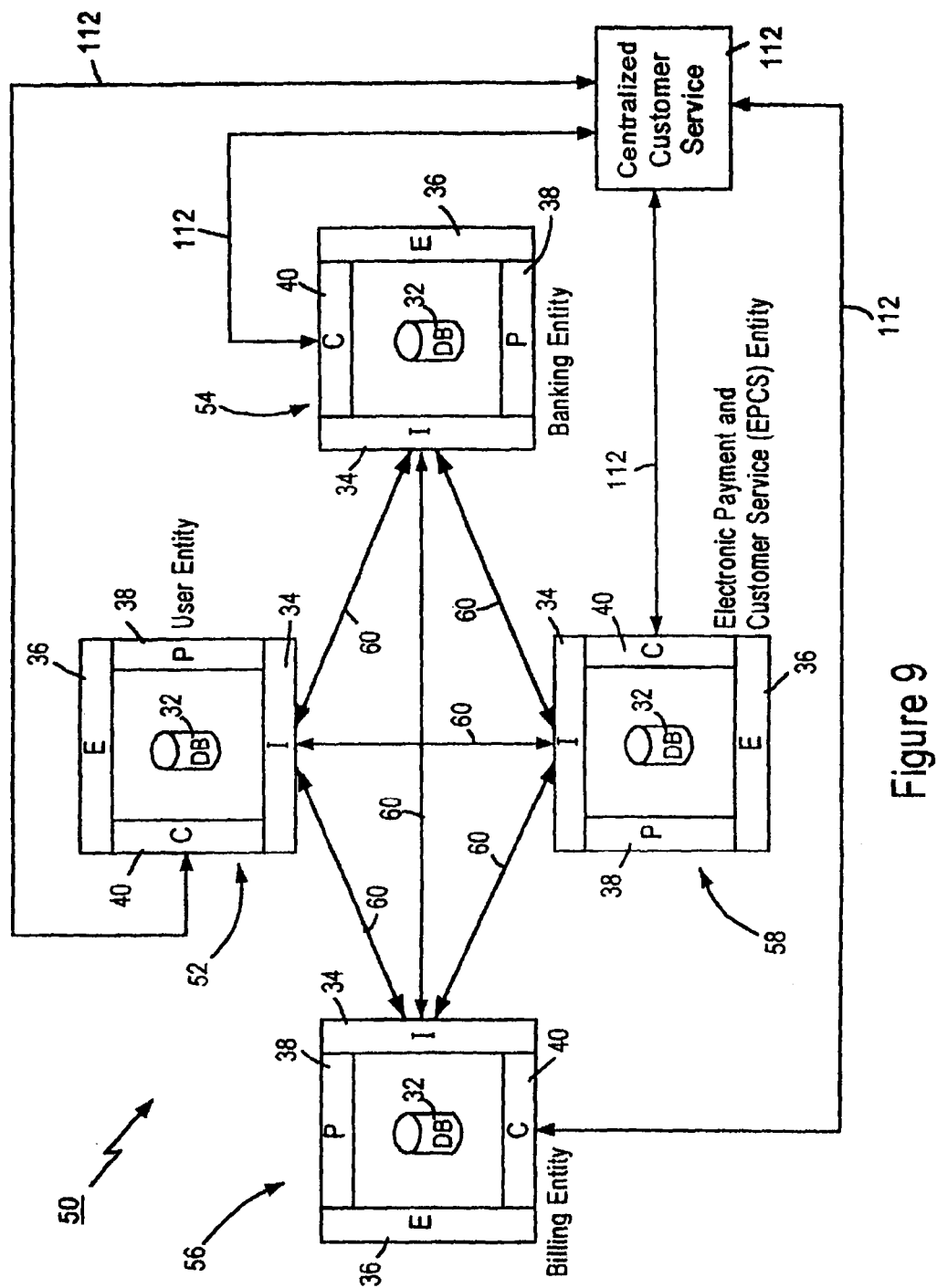
FIG. 9 is a schematic diagram of the electronic bill presentment and payment system shown in FIG. 4, extended to include a centralized customer care entity.

It should be noted that all of the customer care entities described above could be consolidated into a centralized customer service center 110, as shown in FIG. 9. In such an scenario, each of the database entities would process customer care messages to and from the centralized customer service center 110 similar to as described above. The communications between the various database entities and the centralized customer service center 110 would be performed over interconnections 112, which can be electrical wire, optical fiber, or microwave-based interconnections.

Referring to FIGS. 10-15, there are shown flowchart diagrams of data and message flows between the various entities within the system 50. These flowchart diagrams assume that the user entity 52 is an HTML browser client, the banking entity 54 is the primary point of presence for a subscriber to the system 50, the billing entity 56 controls bill presentment, and the EPCS entity 58 controls bill payment.

Figure 10:
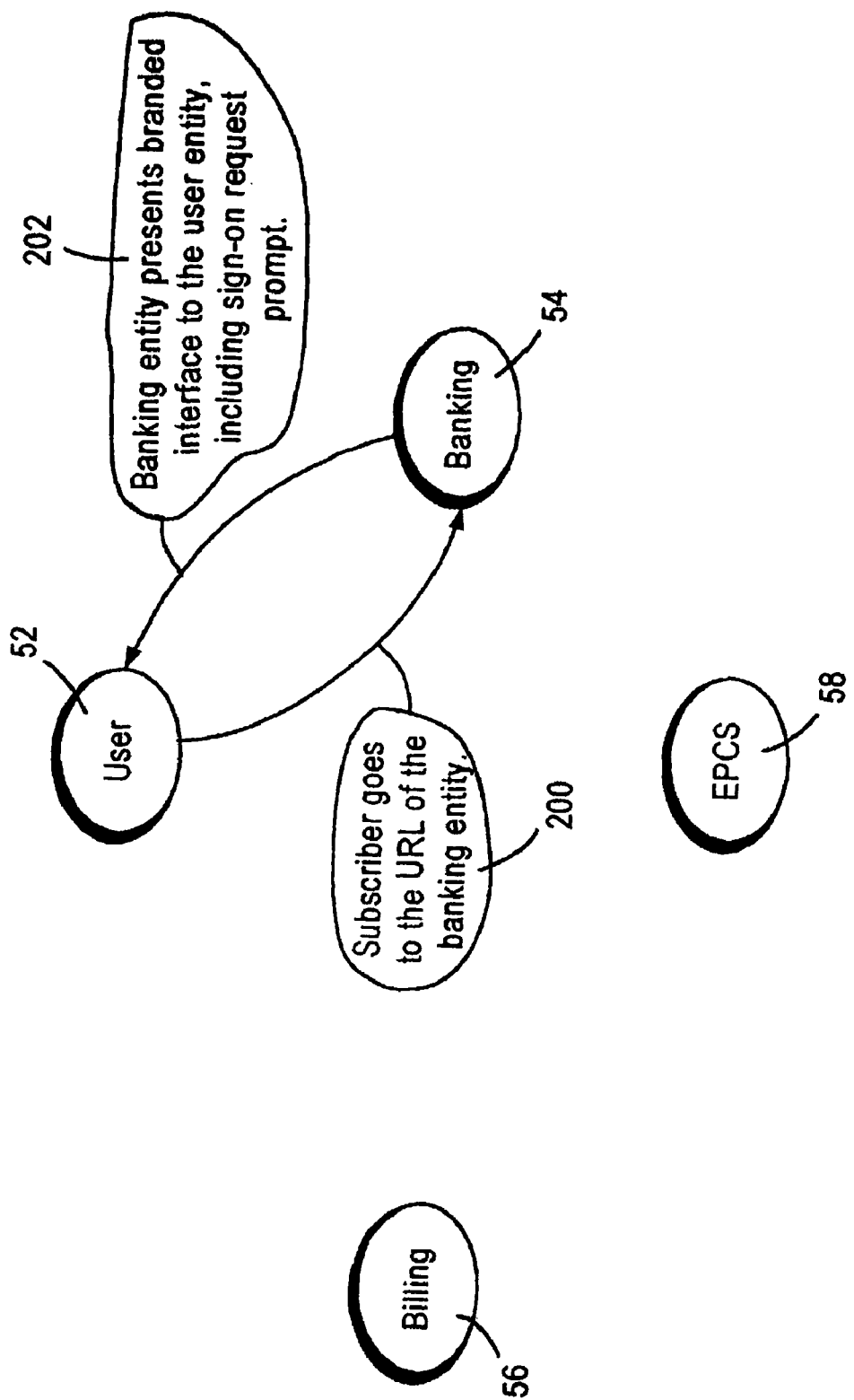
FIG. 10 is a flowchart diagram showing initial sign-on data and message flows between a user entity and a banking entity in the electronic bill presentment and payment system shown in FIG. 4.
Figure 16:
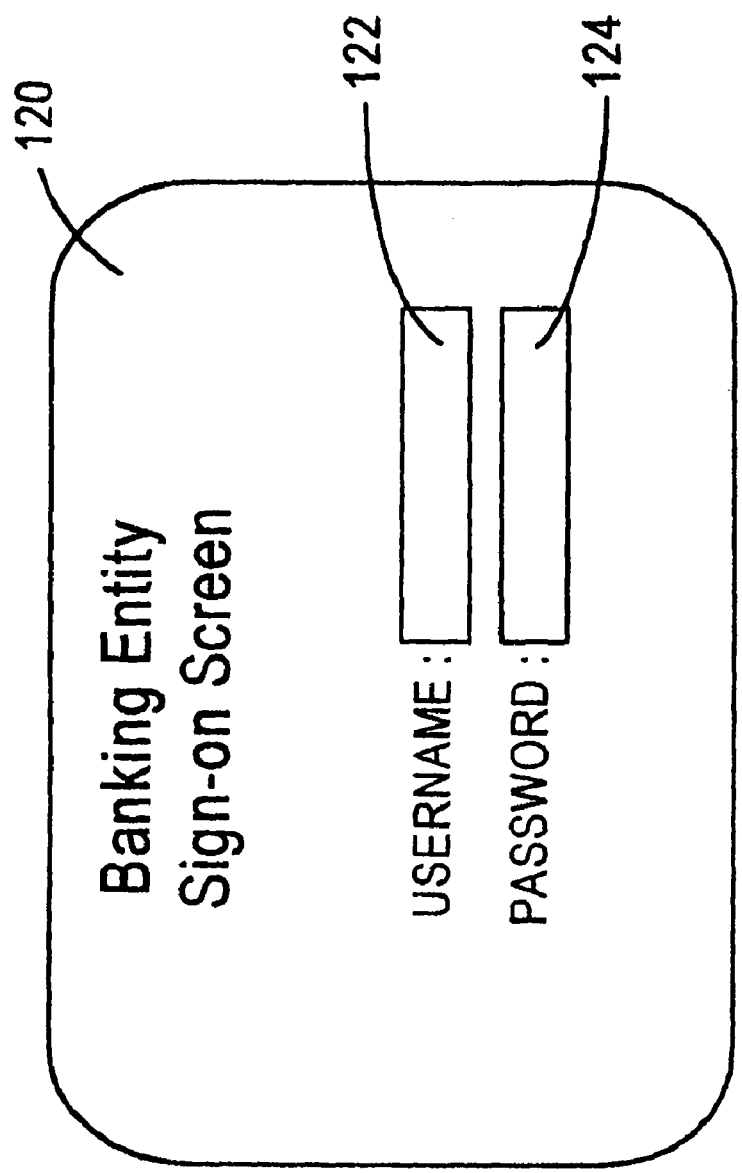
FIG. 16 shows an example of a branded interface having a sign-on request prompt that includes a username field and a password field.

In FIG. 10, a subscriber at the user entity 52 accesses the web site of the banking entity 54 in step 200. In return, the banking entity 54 presents a branded interface to the user entity 52, including a sign-on request prompt in step 202. FIG. 16 shows an example of such a branded interface 120, wherein the sign-on request prompt includes a username field 122 and a password field 124.

Figure 11:
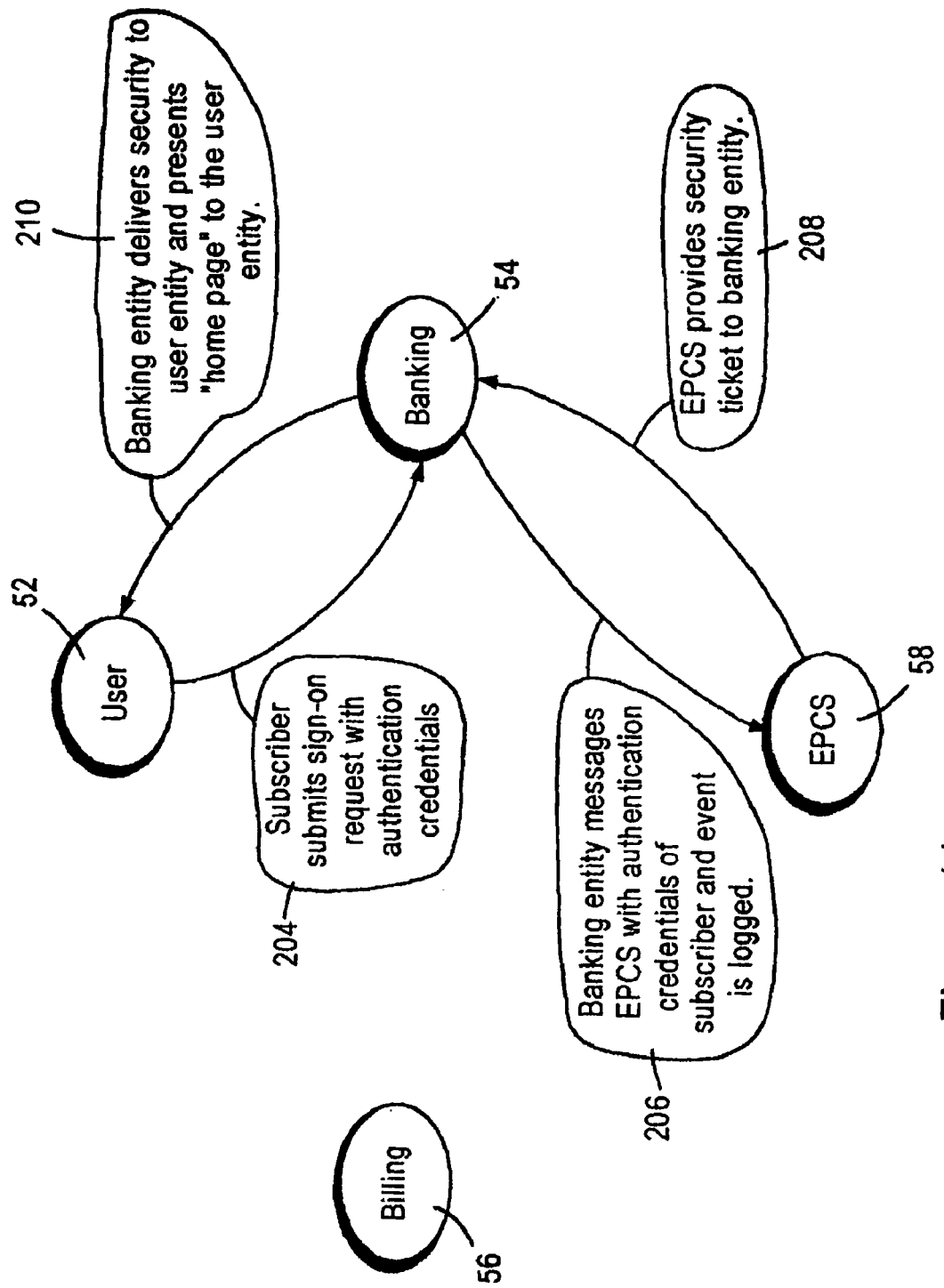
FIG. 11 is a flowchart diagram showing sign-on and authentication data and message flows between a user entity, a banking entity, and an EPCS entity in the electronic bill presentment and payment system shown in FIG. 4.
Figure 17:
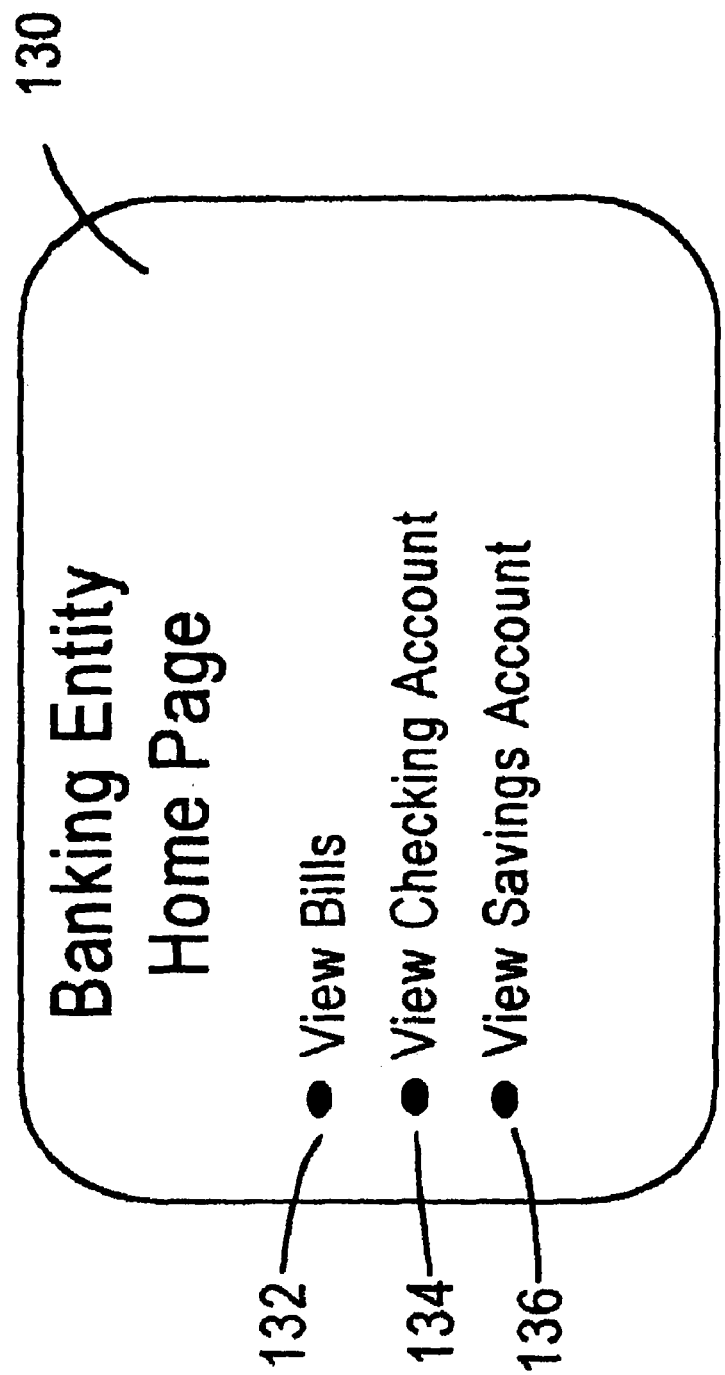
FIG. 17 shows an example of a banking entity home page, including a "view bills" icon, a "view checking account" icon, and a "view savings account" icon.

In FIG. 11, the user entity 52 submits a sign-on request with authentication credentials in steps 204. The banking entity 54 messages the EPCS entity 58 with the authentication credentials of the subscriber and the event is logged in step 206. The EPCS entity 58 provides a security ticket to the banking entity 54 in step 208. The banking entity 54 delivers the security ticket to the user entity 52 and presents its "home page" to user entity 52 in step 210. FIG. 17 shows an example of such a home page 130, which includes a "view bills" icon 132, a "view checking account" icon 134, and a "view savings account" icon 136.

It should be noted that either the EPCS entity 58 or the banking entity 54 could perform the authentication procedure, but in either case the event is still logged in the event tracking database.

Figure 12:
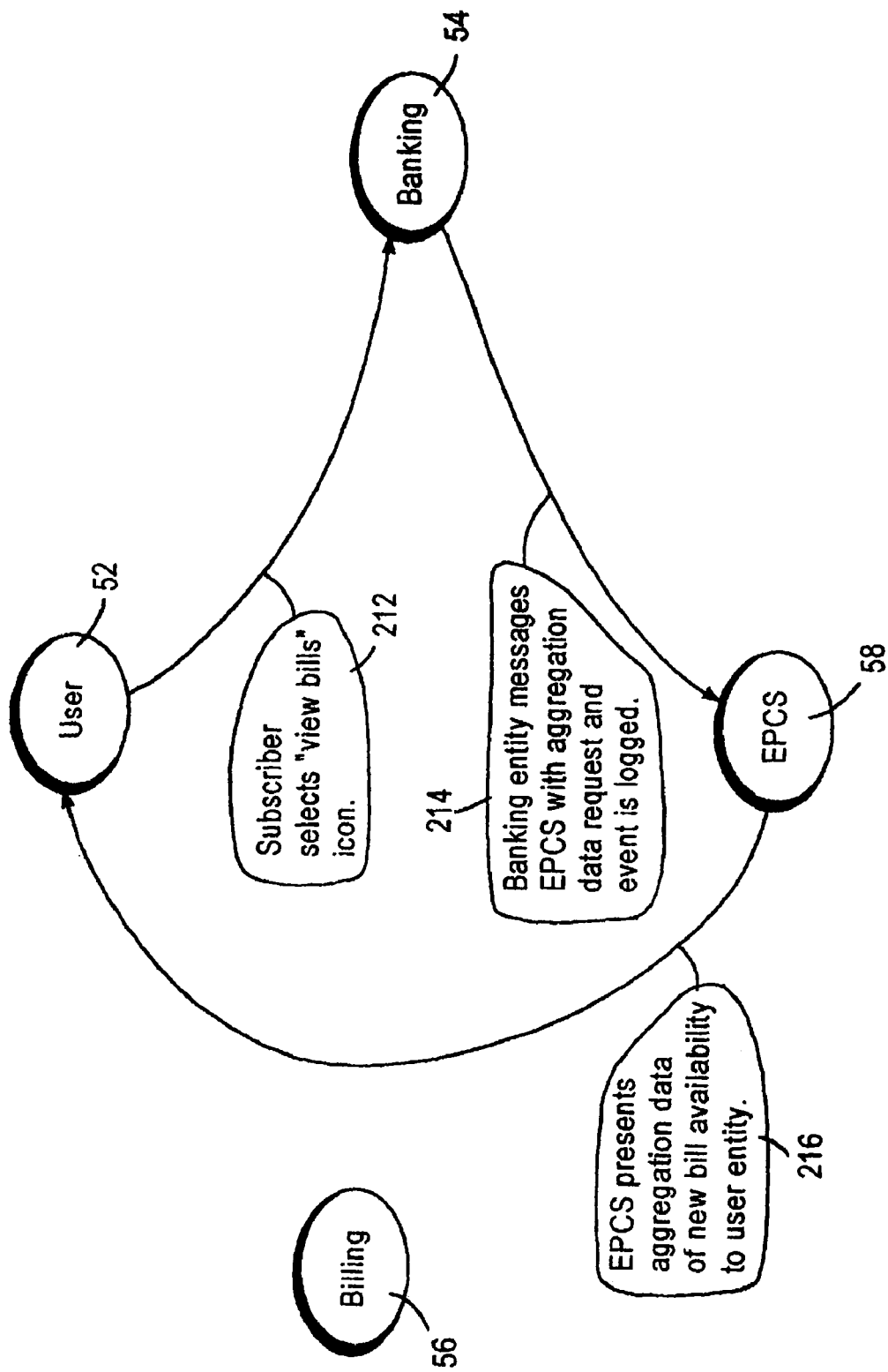
FIG. 12 is a flowchart diagram showing bill availability data and message flows between a user entity, a banking entity, and an EPCS entity in the electronic bill presentment and payment system shown in FIG. 4.
Figure 18:
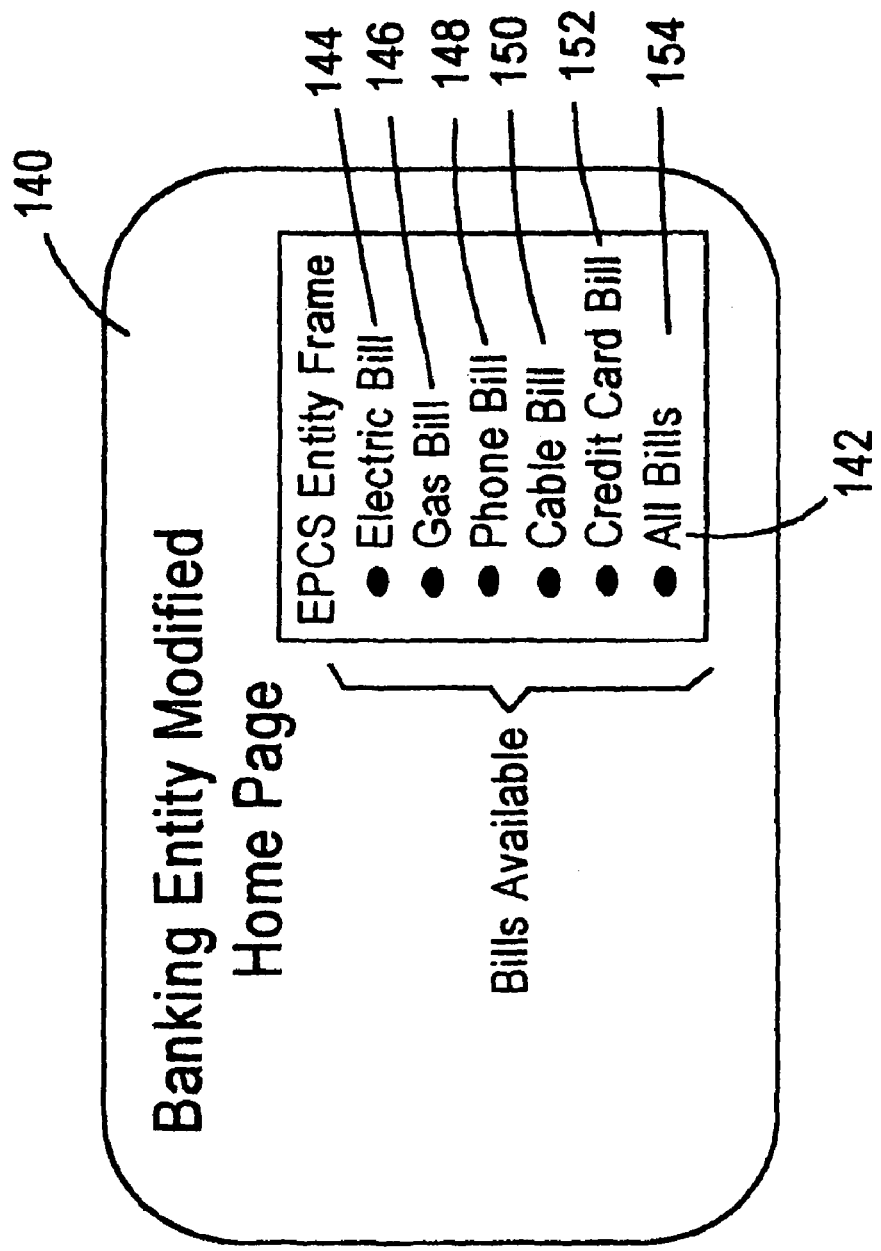
FIG. 18 shows a first modified banking entity home page having a frame presenting new bill availability data.

In FIG. 12, the subscriber selects the "view bills" icon 132 in step 212. The banking entity 54 messages the EPCS entity 58 with an aggregation data request and the event is logged in step 214. The EPCS entity 58 presents aggregation data of new bill availability to user entity 52 in step 216. FIG. 18 shows a first modified home page 140 having an EPCS entity frame 142 presenting the new bill availability data, which includes an "electric bill" icon 144, a "gas bill" icon 146, a "phone bill" icon 148, a "cable bill" icon 150, a "credit card bill" icon 152, and an "all bills" icon 154 which allows all bills to be presented simultaneously, albeit in separate frames.

Figure 13A:
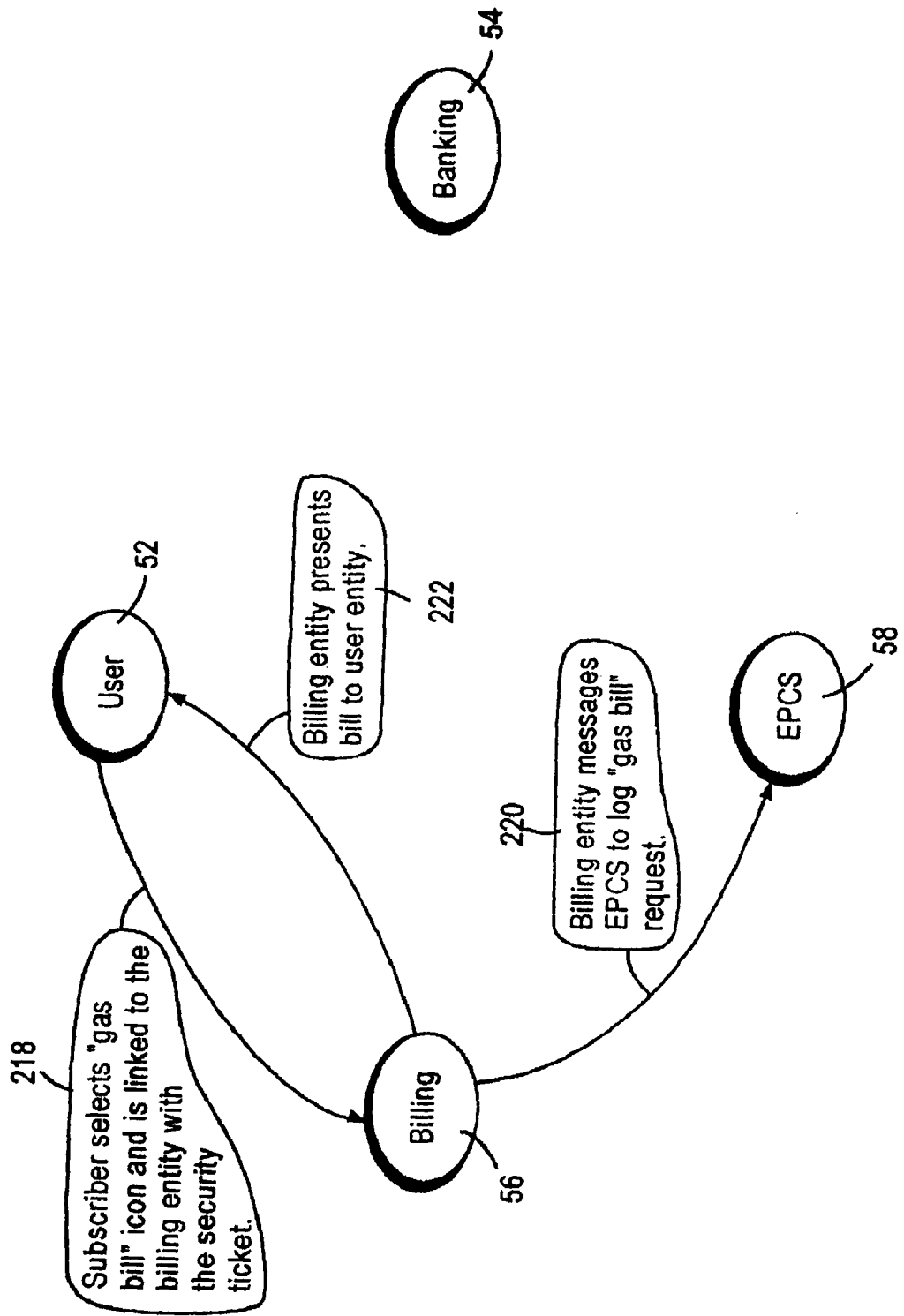
FIG. 13A is a flowchart diagram showing billing entity presentment data and message flows between a user entity, a billing entity, and an EPCS entity in the electronic bill presentment and payment system shown in FIG. 4.
Figure 19:
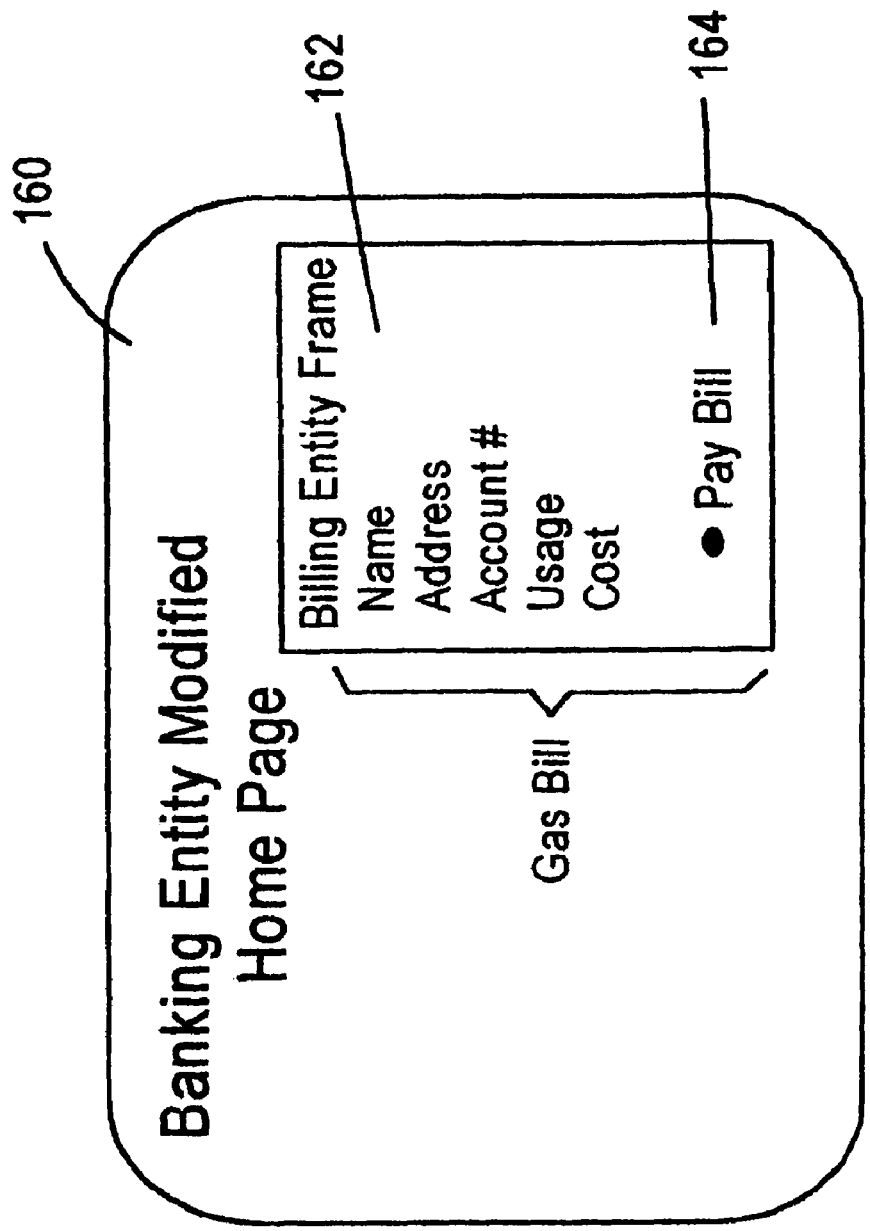
FIG. 19 shows a second modified banking entity home page having a frame presenting detailed bill data.

In FIG. 13A, the subscriber selects the "gas bill" icon 146 and is linked to the billing entity 56 along with the security ticket in step 218. The billing entity 56 messages the EPCS entity 58 to log the "view bill" request event in step 220. The billing entity 56 presents detailed bill data to the user entity 52 in step 222. FIG. 19 shows a second modified home page 160 having a billing entity frame 162 presenting the detailed bill data, which includes the subscriber name, subscriber address, account number, usage, and cost, and a "pay bill" icon 164.

Figure 14:
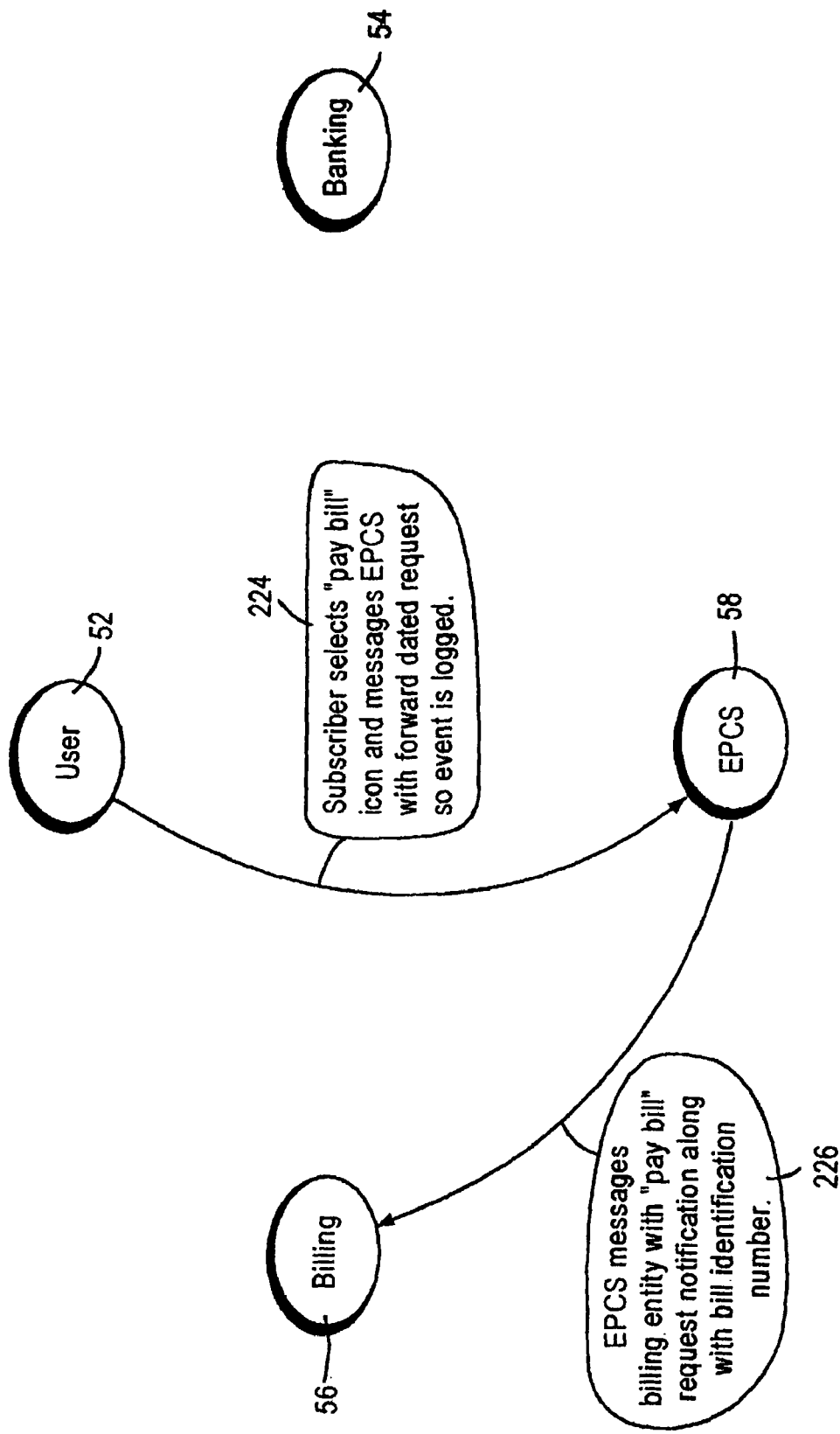
FIG. 14 is a flowchart diagram showing bill payment data and message flows between a user entity, an EPCS entity, and a billing entity in the electronic bill presentment and payment system shown in FIG. 4.

In FIG. 14, the subscriber selects the "pay bill" icon 164 and messages the EPCS entity 58 with a forward dated pay bill request so the event is logged in step 224. The EPCS entity 58 messages the billing entity 56 with a pay bill request notification along with a bill identification number in step 226.

Figure 15:
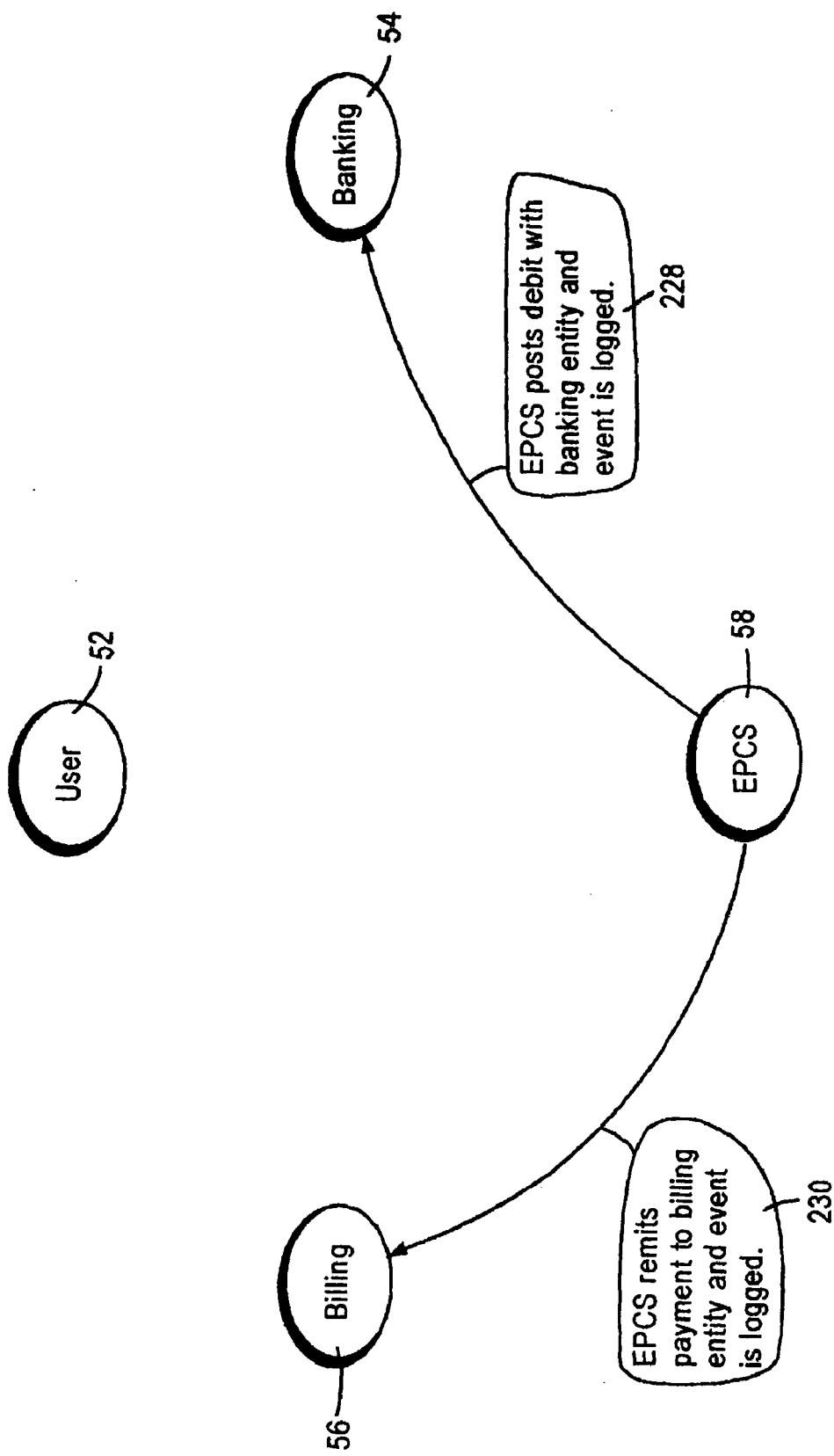
FIG. 15 is a flowchart diagram showing bill remittance and debiting data and message flows between an EPCS entity and a billing entity and a banking entity in the electronic bill presentment and payment system shown in FIG. 4.

In FIG. 15, the EPCS posts a debit with the banking entity 54 and the event is logged in step 228. The EPCS entity 58 then remits a payment to the billing entity 56 and the event is logged in step 230.

Figure 13B:
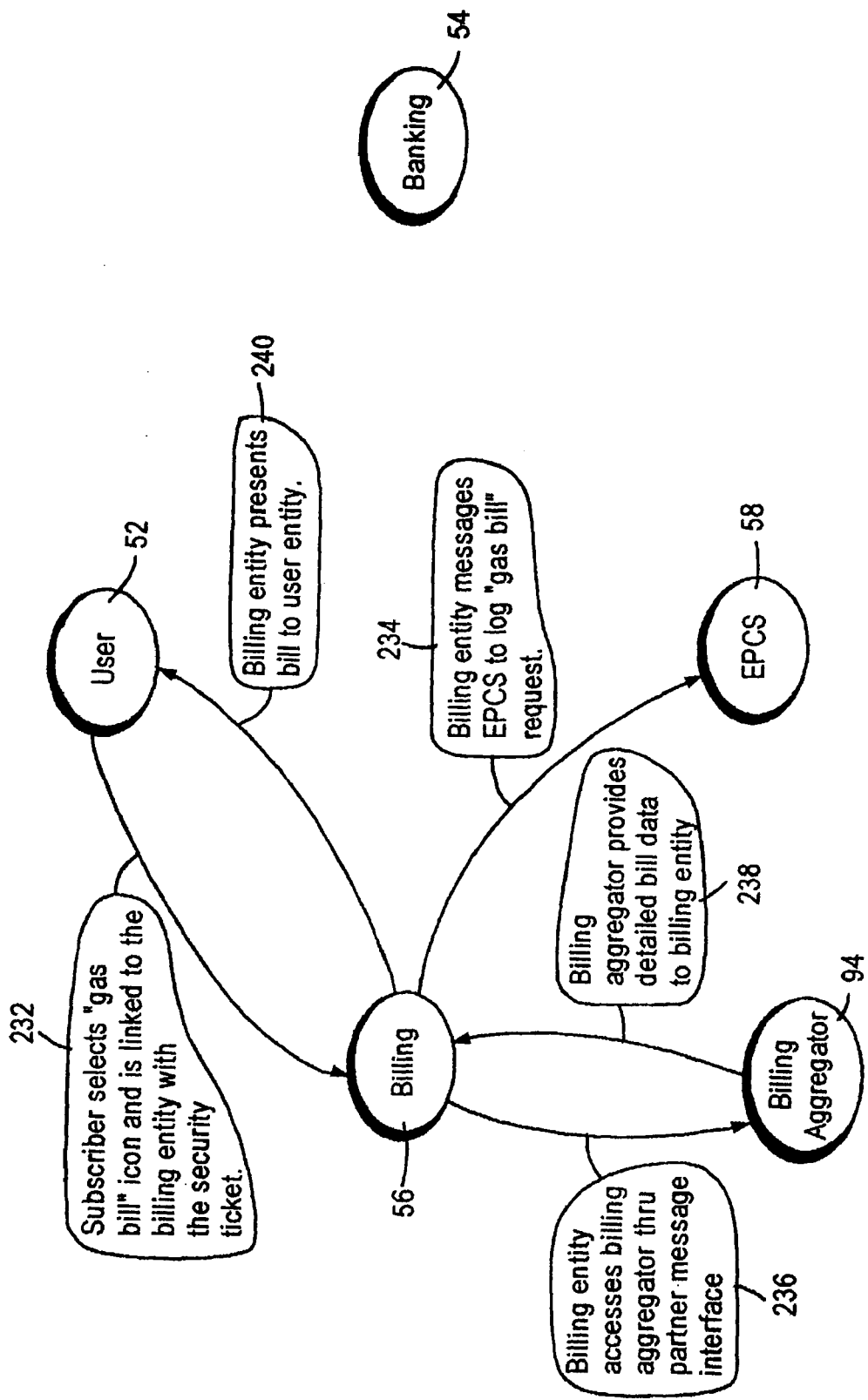
FIG. 13B is a flowchart diagram showing billing aggregator bill presentment data and message flows between a user entity, a billing entity, an EPCS entity, and an established billing aggregator in the electronic bill presentment and payment system shown in FIG. 4.

FIG. 13B can be substituted for FIG. 13A in the above-described sequence of flowchart diagrams to show how detailed bill data can be provided by the established billing aggregator 94 thru the partner message interface 38 of the billing entity 56. In FIG. 13B, the subscriber again selects the "gas bill" icon 146 and is linked to the billing entity 56 along with the security ticket in step 232. The billing entity 56 again messages the EPCS entity 58 to log the "view bill" request event in step 234. However, in this case, detailed bill data is available only from the established billing aggregator 94. Thus, the billing entity 56 accesses the established billing aggregator 94 through its partner message interface 38 in step 236. In response, the established billing aggregator 94 provides detailed bill data to the billing entity 56 in step 238. The billing entity 56 then presents the detailed bill data to the user entity 52 in step 240.

It should be noted that, in an alternative embodiment, the established billing aggregator 94 could present the detailed bill data directly to the user entity 52.

Figure 13C:
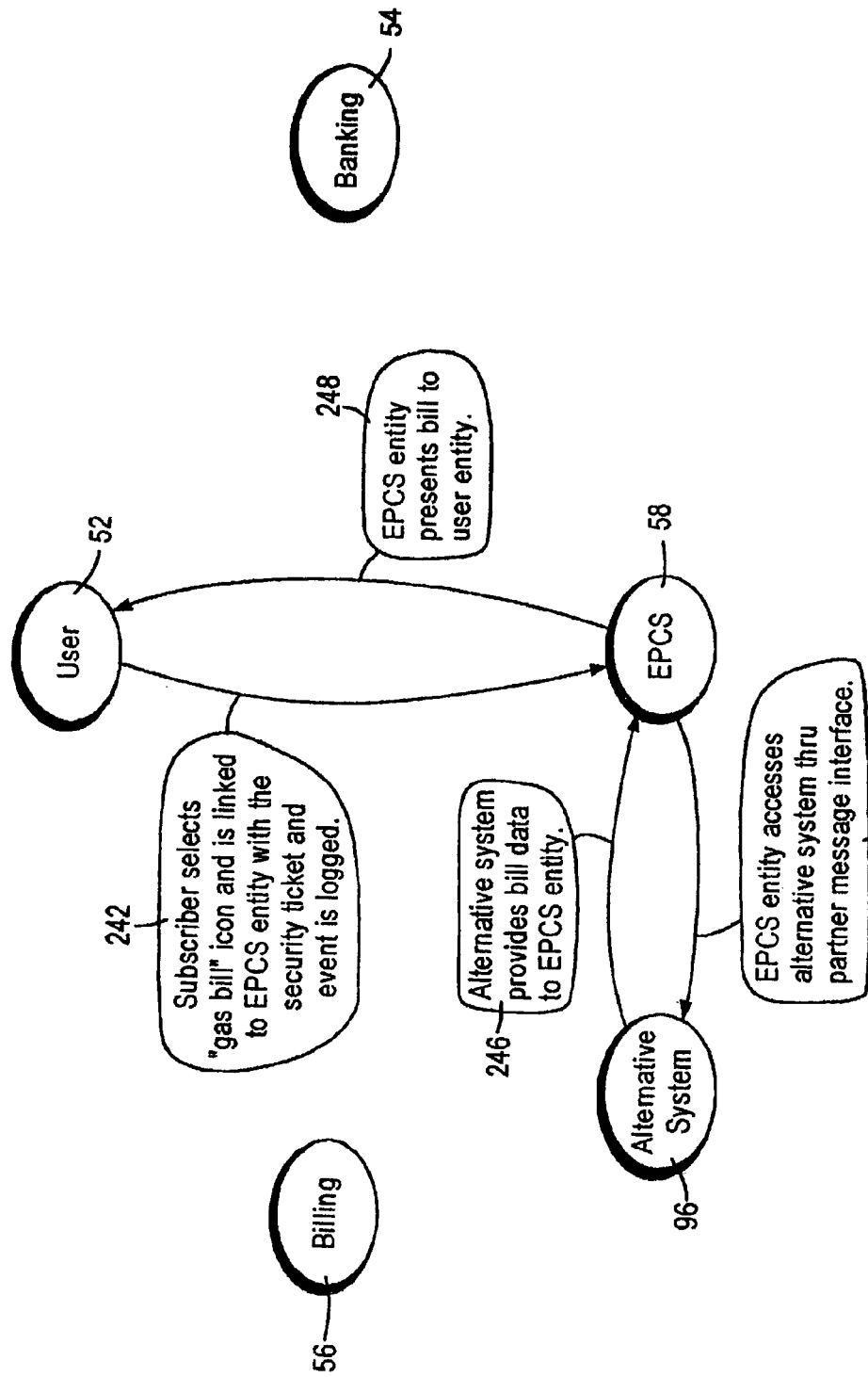
FIG. 13C is a flowchart diagram showing alternative system bill presentment data and message flows between a user entity, an EPCS entity, and an alternative bill presentment and payment system in the electronic bill presentment and payment system shown in FIG. 4.

FIG. 13C can be substituted for FIG. 13A in the above-described sequence of flowchart diagrams to show how detailed bill data can be provided by the alternative bill presentment and payment system 96 thru the partner message interface 38 of the EPCS entity 58. In FIG. 13C, the subscriber selects the "gas bill" icon 146 and is linked back to the EPCS entity 58 along with the security ticket and the event is logged in step 242. In this case, detailed bill data is available only from the alternative bill presentment and payment system 96. Thus, the EPCS entity 58 accesses the alternative bill presentment and payment system 96 through its partner message interface 38 in step 244. In response, the alternative bill presentment and payment system 96 provides detailed bill data to the EPCS entity 58 in step 246. The EPCS entity 58 then presents the detailed bill data to the user entity 52 in step 248.

It should be noted that, as previously described, the EPCS entity 58 will typically require the capabilities of a billing entity 56 in order to present bills to and from the alternative bill presentment and payment system 96. Alternatively, it should be noted that detailed bill data can be provided by the alternative bill presentment and payment system 96 thru the partner message interface 38 of the billing entity 56 in a manner similar to that as described in FIG. 13B.

Figure 20:
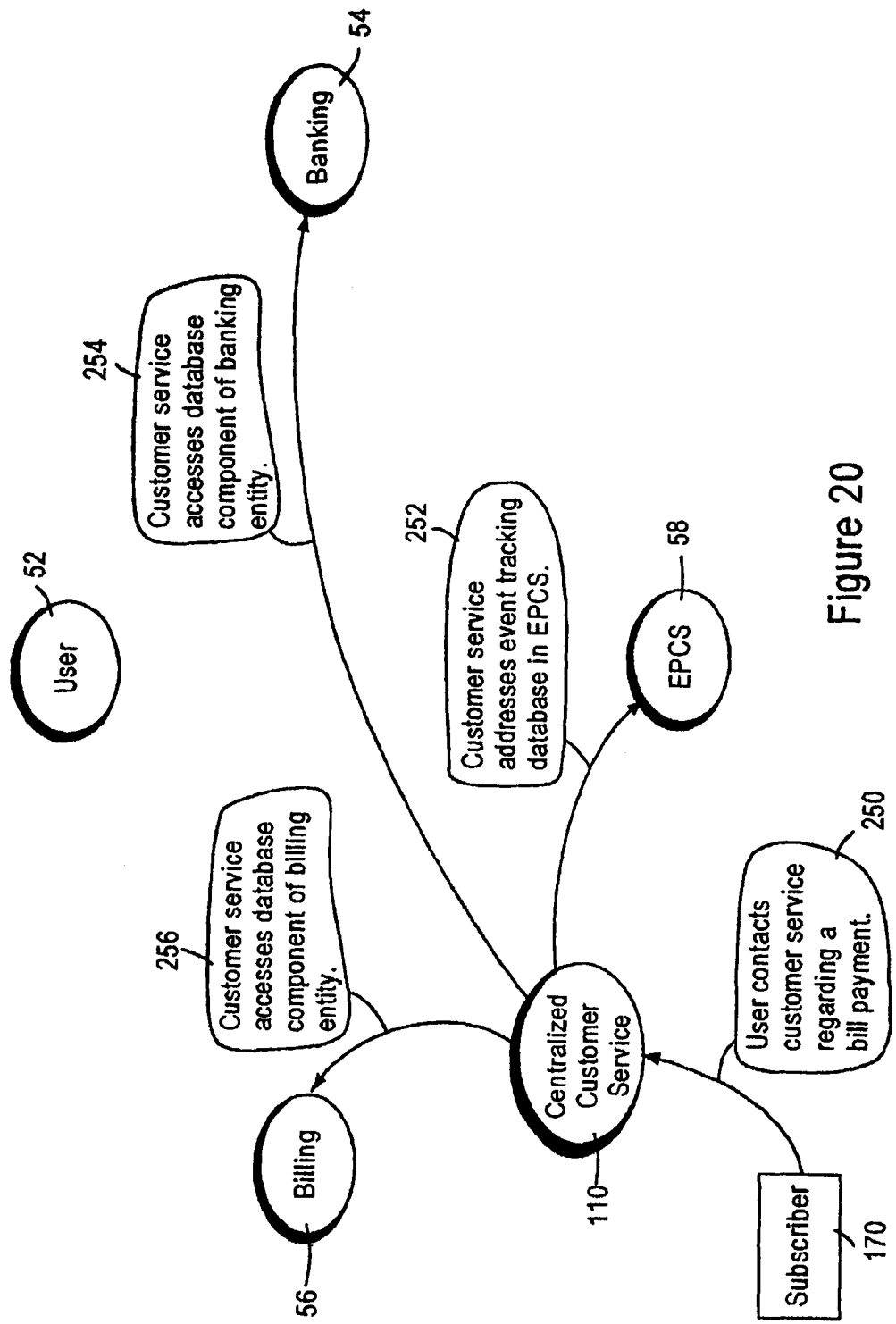
FIG. 20 is a flowchart diagram showing customer service data and message flows between a centralized customer service center, and an EPCS entity, a billing entity, and a banking entity in the electronic bill presentment and payment system shown in FIG. 4.

Referring to FIG. 20, there is shown a flowchart diagram of data and message flows between the centralized customer service center 110 and the various entities within the system 50. A subscriber 170 contacts the centralized customer service center 110 regarding a bill payment in step 250. The centralized customer service center 110 accesses the event tracking database in the EPCS entity 58 to see if a view bill, pay bill, remit payment, or debit posting event has been logged in step 252. If more detailed information regarding, for example, the posting of a debit for a bill, the centralized customer service center 110 can access the database component 32 associated with the banking entity 54, as shown in step 254. Similarly, if more detailed information regarding, for example, the remitting of a payment for a bill, the centralized customer service center 110 can access the database component 32 associated with the billing entity 56, as shown in step 256. It should be noted that, although not shown, the EPCS entity 58 can log all of the above-described accesses performed by centralized customer service center 110.

As is apparent from the foregoing description, the system 50 allows a subscriber to interact directly with individual billers while retaining the benefits of interacting with a single aggregator such as, for example, the ability to retain a single authentication and log-in procedure and a common bill presentation framework. The system 50 also allows a subscriber to retain the benefits of interacting with a single aggregator while allowing the billers and banks to retain certain preferences such as, for example, the ability to retain control of subscriber-related data and a communication channel with each subscriber.

At this point it should be noted that while the foregoing detailed description was directed to an electronic bill presentment and payment technique, any number of system types can employ the distributed database entities 30 to facilitate distributed data accessing within a network in accordance with the present invention.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

What is claimed is:

1. A method, comprising:
receiving, by a first system comprising one or more computers associated with a biller from a computer associated with a consumer via a communications network, an electronic request for a bill of the biller for the consumer, wherein the request is received based at least in part on a consumer selection of a bill availability identifier that electronically links the computer associated with the customer to the first system, the bill availability identifier being communicated to the computer associated with the consumer via the communications network by a second system comprising one or more computers associated with a payment service provider; and
transmitting, from the first system to the computer associated with the consumer over the communications network and responsive to the received request, electronic billing information associated with the bill and an associated selectable payment indicator,
wherein a consumer selection of the selectable payment indicator electronically links, via the communications network, the computer associated with the consumer to the second system to electronically request payment of the bill on behalf of the consumer.

2. The method of claim 1, further comprising:
transmitting, to the second system from the first system via the communications network, a notification that the billing information has been transmitted to the consumer.

3. The method of claim 1, wherein transmitting billing information associated with the bill comprises transmitting at least one of summary information associated with the bill, detailed information associated with the bill, or an electronic copy of the bill.

4. The method of claim 1, wherein the first system comprises a biller network server.

5. The method of claim 1, wherein the consumer selection of the selectable payment indicator initiates a payment process that comprises the payment service provider directing a debiting of funds in a demand deposit account of the consumer maintained by a financial institution.

6. The method of claim 5, wherein the payment process further comprises remitting a payment to an account of the biller on behalf of the consumer, and further comprising:
transmitting, to the second system via the communications network, a notification that the payment has been received.

7. The method of claim 1, further comprising:
receiving, at the first system from the second system via the communications network, a notification of the receipt of a consumer request for payment of the bill on behalf of the consumer.

8. The method of claim 7, wherein the notification of the receipt of a consumer request for payment of the bill includes an identification of the bill.

9. A system, comprising:
a communications interface associated with a bill presentment network station, the communications interface operable (i) to receive, from a consumer network station via a communications network and based at least in part on a consumer selection of a bill availability identifier that electronically links the consumer network station to the bill presentment network station, a request for a bill of a biller for the consumer, wherein the bill availability identifier is transmitted to the consumer network station via the communications network from a payment service provider network station different than the bill presentment network station, and (ii) to transmit, to the consumer over the communications network, billing information associated with the bill and an associated selectable payment indicator; and a processor associated with the bill presentment network station, the processor operable (i) to receive the request from the communications interface and (ii) to direct the communications interface to transmit the billing information and the associated selectable payment indicator to the consumer network station in response to the received request, wherein a consumer selection of the selectable payment indicator electronically links, via the communications network, the consumer network station to the payment service provider network station to electronically request payment of the bill on behalf of the consumer.

10. The system of claim 9, wherein:

the processor is further operable to direct the communications interface to transmit, to the payment service provider network station via the communications network, a notification that the billing information has been transmitted to the consumer, and the communications interface is further operable to transmit the notification.

11. The system of claim 9, wherein the billing information comprises at least one of summary information associated with the bill, detailed information associated with the bill, or an electronic copy of the bill.

12. The system of claim 9, wherein the bill presentment network station comprises a network station maintained by the biller.

13. The system of claim 9, wherein the consumer selection of the selectable payment indicator initiates a payment process that comprises the payment service provider network station directing a debiting of funds in a demand deposit account of the consumer maintained by a financial institution.

14. The system of claim 13, wherein:

the payment process further comprises the payment service provider network station remitting a payment to an account of the biller on behalf of the consumer, the processor is further operable to direct the communications interface to transmit, to the payment service provider network station via the communications network, a notification that the payment has been received, and the communications interface is further operable to transmit the notice.

15. The system of claim 9, wherein the communications interface is further operable to receive, from the payment service provider network station via the communications network, a notification of the receipt of a consumer request for payment of the bill on behalf of the consumer.

16. The system of claim 15, wherein the notification includes an identification of the bill.

17. A system, comprising:

means for receiving, at a first network server associated with a biller from a computer associated with a consumer via a communications network, an electronic request for a bill of the biller for the consumer, wherein the request is received based at least in part on a consumer selection of a bill availability identifier that electronically links the computer to the first network server, the bill availability identifier being communicated to the computer via the communications network by a second network server associated with a payment service provider; and means for transmitting, from the first network server to the computer over the communications network and responsive to the received request, electronic billing information associated with the bill and an associated selectable payment indicator, wherein a consumer selection of the selectable payment indicator electronically links, via the communications network, the computer to the second network server to electronically request payment of the bill on behalf of the consumer.

18. A method, comprising:

communicating, from a payment service provider system comprising one or more payment service provider computers to a consumer computer via a communications network, a bill availability identifier for a bill of a biller, wherein a consumer selection of the bill availability identifier electronically links the consumer computer to a bill presentment entity system comprising one or more bill presentment entity computers;

receiving, at the payment service provider system from the consumer computer via the communications network, a request to pay the bill on behalf of the consumer, wherein the request is received as a result of the consumer selecting a selectable payment indicator that electronically links the consumer computer to the payment service provider system via the communications network, the selectable payment indicator being communicated to the consumer computer via the communications network by the bill presentment entity system in association with billing information for the bill and responsive to the consumer selection of the bill availability identifier; and initiating, by the payment service provider system on behalf of the consumer and responsive to the received request, a payment process, wherein the bill presentment entity system is different than the payment service provider system.

19. A system, comprising:

at least one communications interface associated with a payment service provider network station, the at least one communications interface operable (i) to transmit, to a consumer computer via a communications network, a bill availability identifier for a bill of a biller, wherein a consumer selection of the bill availability identifier electronically links the consumer computer to a bill presentment entity network station, and (ii) to receive, from the consumer computer via the communications network, a request to pay a bill of a biller on behalf of the consumer, wherein the request is received as a result of the consumer selecting a selectable payment indicator that electronically links the consumer computer to the payment service provider network station via the communications network, the selectable payment indicator being communicated to the consumer computer via the communications network by the bill presentment entity network station in association with billing information for the bill and responsive to the consumer selection of the bill availability identifier; and at least one processor associated with the payment service provider network station, the at least one processor operable (i) to direct the at least one communications interface to transmit the bill availability identifier, (ii) to receive the request from the at least one communications interface and (iii) to initiate, on behalf of the consumer and responsive to the received request, a payment process, wherein the bill presentment entity network station is different than the payment service provider network station.

20. The method of claim 18, further comprising:

receiving, by the payment service provider system from the bill presentment entity system via the communications network, a notification that the billing information has been transmitted to the consumer.

21. The method of claim 18, wherein the payment process comprises directing a debiting of funds in a demand deposit account of the consumer maintained by a financial institution.

22. The method of claim 18, wherein the payment process comprises remitting a payment to an account of the biller on behalf of the consumer, and further comprising:

receiving, by the payment service provider system, a notification that the payment has been received.

23. The method of claim 18, further comprising:

communicating, by the payment service provider system to the bill presentment entity system via the communications network, a notification of the receipt of a consumer request for payment of the bill on behalf of the consumer.

24. The method of claim 23, wherein the notification of the receipt of a consumer request for payment of the bill includes an identification of the bill.

25. The system of claim 19, wherein the at least one communication interface is further operable to receive, from the bill presentment entity network station via the communications network, a notification that the billing information has been transmitted to the consumer.

26. The system of claim 19, wherein the payment process comprises the payment service provider network station directing a debiting of funds in a demand deposit account of the consumer maintained by a financial institution.

27. The system of claim 19, wherein:

the payment process comprises the payment service provider network station remitting a payment to an account of the biller on behalf of the consumer, and the at least one communications interface is further operable to receive a notification that the payment has been received.

28. The system of claim 19, wherein:

the at least one processor is further operable to direct the at least one communications interface to communicate, to the bill presentment entity network server via the communications network, a notification of the receipt of a consumer request for payment of the bill on behalf of the consumer, and the at least one communications interface is further operable to transmit the notification.

29. The system of claim 28, wherein the notification of the receipt of a consumer request for payment of the bill includes an identification of the bill.

* * * * *

UNITED STATES PATENT AND TRADEMARK OFFICE
CERTIFICATE OF CORRECTION

| | | |
|---|---|---|
| PATENT NO. | : 7,778,901 B2 | Page 1 of 1 |
| APPLICATION NO. | : 11/059370 | |
| DATED | : August 19, 2010 | |
| INVENTOR(S) | : Ravi Ganesan et al. | |

It is certified that error appears in the above-identified patent and that said Letters Patent is hereby corrected as shown below:

At column 18, line 17, delete "customer" and insert --consumer--.

Signed and Sealed this
Twenty-eighth Day of December, 2010

David J. Kappos
*Director of the United States Patent and Trademark Office*